United States Patent
Iwazaki

(10) Patent No.: US 7,725,247 B2
(45) Date of Patent: May 25, 2010

(54) ABNORMALITY DIAGNOSTIC DEVICE AND ABNORMALITY DIAGNOSTIC METHOD FOR AIR-FUEL RATIO SENSOR

(75) Inventor: Yasushi Iwazaki, Ebina (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 112 days.

(21) Appl. No.: 12/068,322

(22) Filed: Feb. 5, 2008

(65) Prior Publication Data
US 2008/0189008 A1 Aug. 7, 2008

(30) Foreign Application Priority Data
Feb. 6, 2007 (JP) ............................. 2007-026869

(51) Int. Cl.
G06F 19/00 (2006.01)
G06G 7/70 (2006.01)
(52) U.S. Cl. ................ 701/114; 701/107; 701/109; 123/690; 123/198 D
(58) Field of Classification Search ........... 123/688, 123/690; 701/107, 109, 114; 702/116, 183, 702/185; 73/114.72, 114.73
See application file for complete search history.

(56) References Cited

U.S. PATENT DOCUMENTS

| | | | | |
|---|---|---|---|---|
| 5,964,208 A | * | 10/1999 | Yamashita et al. | 123/674 |
| 5,970,967 A | * | 10/1999 | Uchikawa | 123/688 |
| 6,032,659 A | * | 3/2000 | Yamashita et al. | 123/674 |
| 6,287,453 B1 | * | 9/2001 | Rosel et al. | 205/783 |
| 2004/0040283 A1 | * | 3/2004 | Yasui et al. | 60/276 |
| 2005/0216175 A1 | * | 9/2005 | Takahashi et al. | 701/109 |
| 2006/0089731 A1 | * | 4/2006 | Kawakatsu et al. | 700/46 |
| 2006/0207560 A1 | * | 9/2006 | Kobayashi | 123/431 |

FOREIGN PATENT DOCUMENTS

| | | |
|---|---|---|
| JP | A 6-347438 | 12/1994 |
| JP | A 8-232727 | 9/1996 |
| JP | A 2003-254129 | 9/2003 |
| JP | A 2004-68602 | 3/2004 |
| JP | A 2004-360591 | 12/2004 |
| JP | A 2005-30358 | 2/2005 |
| WO | WO 00/04282 | 1/2000 |

* cited by examiner

Primary Examiner—Stephen K Cronin
Assistant Examiner—Anthony L Bacon
(74) Attorney, Agent, or Firm—Oliff & Berridge, PLC

(57) ABSTRACT

A system extending from a fuel injection valve to an air-fuel ratio sensor is modeled by using a first order response delay element. Parameters of the first order response delay element T, k are identified based on an input u(t) based on an input air-fuel ratio that occurs when the input air-fuel ratio is relatively sharply changed in accordance with an engine operation requirement, and an output y(t) of the air-fuel ratio sensor that changes in response to a change in the input air-fuel ratio. Then, an abnormality of characteristics (response rate and output) of the air-fuel ratio sensor is determined based on the identified parameter.

22 Claims, 11 Drawing Sheets

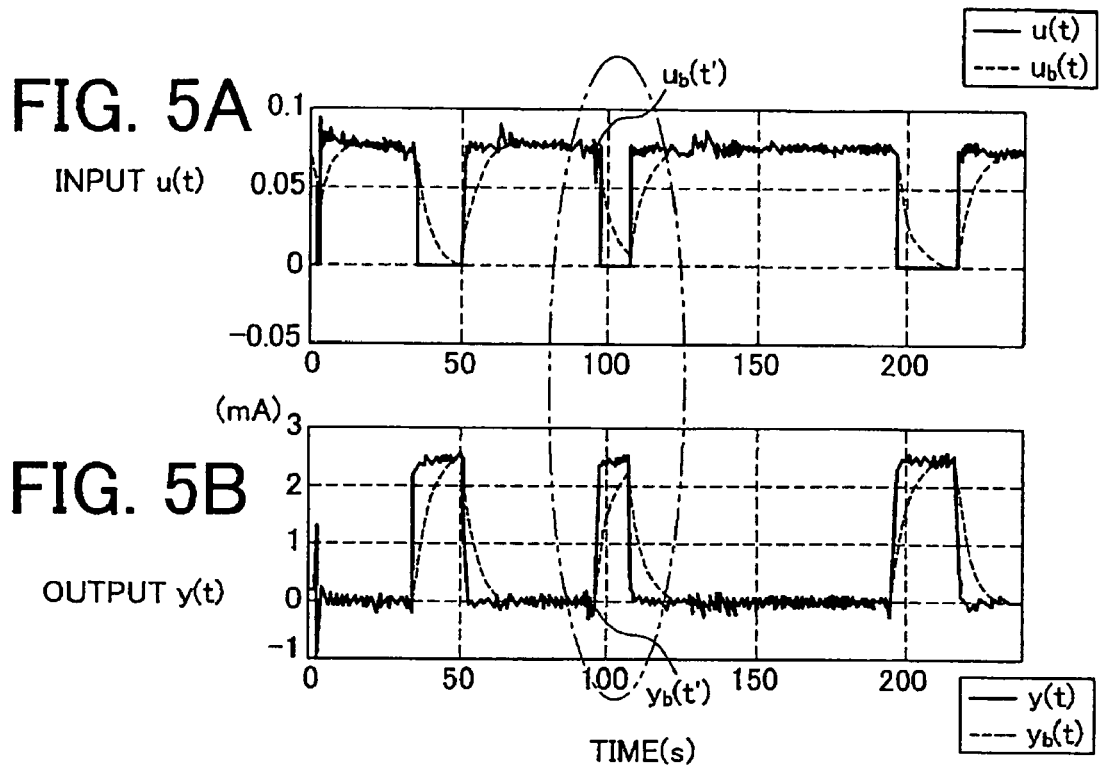
FIG. 5A
FIG. 5B
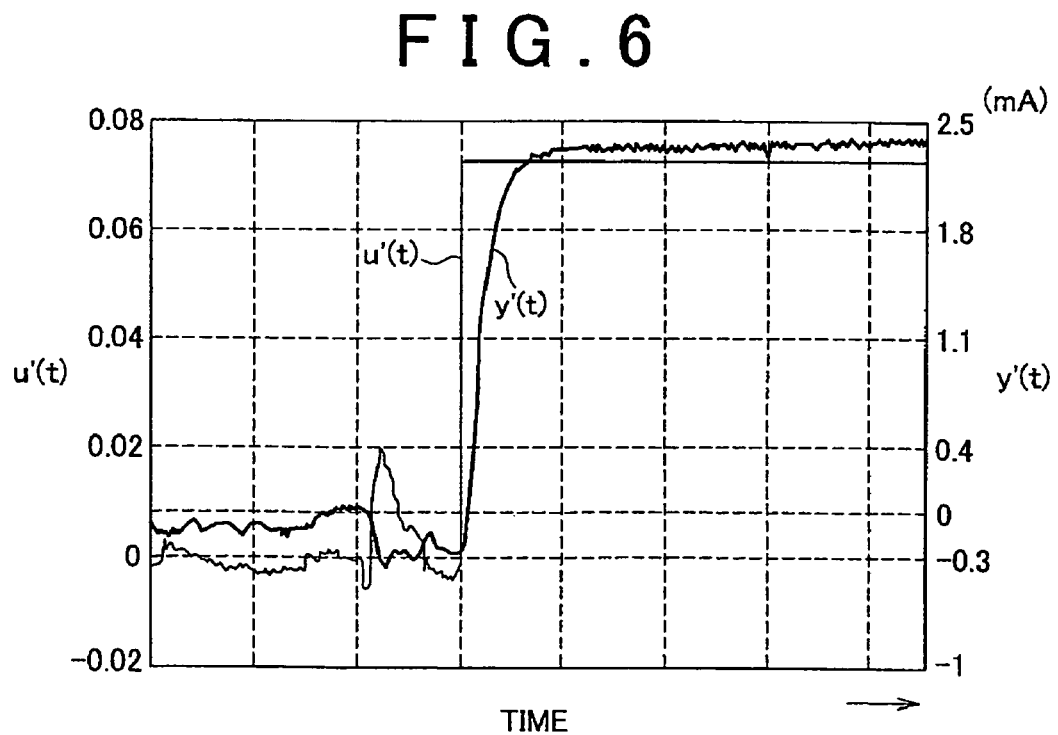
FIG. 6

ABNORMALITY DIAGNOSTIC DEVICE AND ABNORMALITY DIAGNOSTIC METHOD FOR AIR-FUEL RATIO SENSOR

INCORPORATION BY REFERENCE

The disclosure of Japanese Patent Application No. 2007-026869 filed on Feb. 6, 2007 including the specification, drawings and abstract is incorporated herein by reference in its entirety.

BACKGROUND OF THE INVENTION

1. Field of the Invention

The invention relates to a device and a method of diagnosing abnormality of an air-fuel ratio sensor that detects the air-fuel ratio of exhaust gas of an internal combustion engine.

2. Description of the Related Art

In an internal combustion engine equipped with an exhaust gas purification system that uses a catalyst, it is indispensable to control the mixing proportion between air and fuel in a mixture that is burned in the internal combustion engine, that is, the air-fuel ratio, in order to effectively remove harmful components of exhaust gas through the use of the catalyst. In order to perform such a control of the air-fuel ratio, an air-fuel ratio sensor that detects the air-fuel ratio on the basis of the concentration of a specific component of exhaust gas is provided on an exhaust passageway of the internal combustion engine, and a feedback control is carried out so as to bring the detected air-fuel ratio closer to a predetermined target air-fuel ratio.

Incidentally, if the air-fuel ratio sensor has an abnormality, such as degradation, a failure, etc., the air-fuel ratio feedback control cannot be accurately executed, so that the exhaust gas emission deteriorates. Therefore, diagnosis of abnormality of the air-fuel ratio sensor has been conventionally conducted. Particularly, in the case of engines mounted in motor vehicles, the detection of abnormality of the air-fuel ratio sensor in a vehicle-mounted state (on board) is required by laws or regulations or the like in many countries in order to prevent the motor vehicles from running while emitting deteriorated exhaust gas.

Japanese Patent Application Publication No. 2005-30358 (JP-A-2005-30358) discloses an abnormality detection device for an air-fuel ratio sensor that cyclically increases and decreases the air-fuel ratio through an open-loop control and that detects an abnormality of the air-fuel ratio sensor on the basis of the length or area of the locus of the air-fuel ratio sensor output that increases and decreases corresponding to the cyclical increases and decreases in the air-fuel ratio. Besides, Japanese Patent Application Publication No. 2004-68602 (JP-A-2004-68602) discloses an air-fuel ratio control device that recursively identifies a plant model representing a detection delay characteristic of the air-fuel ratio sensor, and that sets a control gain in the air-fuel ratio feedback control by using a parameter of the identified plant model. This control device stops the serial identification, when performing the diagnosis of response degradation of the air-fuel ratio sensor during the feedback control.

However, the technology described in Japanese Patent Application Publication No. 2005-30358 (JP-A-2005-30358), while being able to discriminate whether the air-fuel ratio sensor itself is normal or abnormal, is not able to discriminate which one of the characteristics of the air-fuel ratio sensor is normal or abnormal. That is, although the air-fuel ratio sensor has a plurality of characteristics, the technology described in Japanese Patent Application Publication No. 2005-30358 (JP-A-2005-30358) cannot discriminate which of the characteristics is abnormal.

Besides, the technology described in Japanese Patent Application Publication No. 2005-30358 (JP-A-2005-30358) performs an active air-fuel ratio control of forcing the air-fuel ratio to increase and decrease for the abnormality detection of the air-fuel ratio sensor. However, a problem of this technology is that if the active air-fuel ratio control is carried out, deterioration of the exhaust gas emission is inevitable.

On the other hand, the technology described in Japanese Patent Application Publication No. 2004-68602 (JP-A-2004-68602) diagnoses degradation of only the response rate, among the characteristics of the air-fuel ratio sensor. Although the air-fuel ratio sensor has other characteristics as well, the technology cannot discriminate whether or not there is abnormality with regard to the other characteristics. In the first place, the technology described in Japanese Patent Application Publication No. 2004-68602 (JP-A-2004-68602) is a technology that relates to the air-fuel ratio control, and that is not specialized in the abnormality diagnosis of an air-fuel ratio sensor. Hence, the parameters of the recursively identified plant models are used to set control gains in the air-fuel ratio feedback control, and the recursive identification is stopped at the time of the response delay diagnosis about the air-fuel ratio sensor.

SUMMARY OF THE INVENTION

The invention provides an abnormality diagnostic device and an abnormality diagnostic method for an air-fuel ratio sensor which are capable of suitably diagnosing abnormalities of individual characteristics of an air-fuel ratio sensor and of restraining the deterioration of the exhaust gas emission at the time of diagnosis.

A first aspect of the invention is an abnormality diagnostic device for an air-fuel ratio sensor that detects an air-fuel ratio of an exhaust gas of an internal combustion engine, including: identification unit that models a system extending from a fuel injection valve to the air-fuel ratio sensor by using a first order response delay element, and that identifies a parameter of the first order response delay element based on an input air-fuel ratio given to the air-fuel ratio sensor which occurs when the input air-fuel ratio is relatively sharply changed in accordance with an engine operation requirement, and an output of the air-fuel ratio sensor that changes in response to a change in the input air-fuel ratio; and an abnormal determination unit that determines of an abnormality of a predetermined characteristic of the air-fuel ratio sensor based on the parameter identified by the identification unit.

According to the first aspect of the invention, it is not merely determined whether or not the air-fuel ratio sensor is abnormal, but it is determined whether or not a predetermined characteristic of the air-fuel ratio sensor is abnormal. Hence, the abnormality diagnostic device is able to determine which one of a plurality of characteristics of the air-fuel ratio sensor is abnormal, and therefore is able to more precisely and minutely execute the abnormality diagnosis of the air-fuel ratio sensor.

Furthermore, according to the first aspect, the identification of the parameter is performed on the basis of the input and the output occurring when the input air-fuel ratio given to the air-fuel ratio sensor is relatively sharply changed in accordance with an engine operation requirement. It is desirable that the model identification of the air-fuel ratio sensor be performed at a timing at which the input air-fuel ratio changes as sharply and greatly as possible. In the case of the first aspect, the model identification is performed when the input air-fuel ratio is changed as mentioned above by a normal engine control. Therefore, the deterioration of exhaust gas emission at the time of diagnosis can be restrained without making an intentional and forced change in the input air-fuel ratio through the active air-fuel ratio control or the like.

The abnormal determination unit may determine the abnormalities of at least two of characteristics of the air-fuel ratio sensor based on at least two parameters identified by the identification unit. Therefore, since the abnormalities are determined with respect to each of at least two of the characteristics of the air-fuel ratio sensor, the abnormalities can be determined simultaneously and individually for the at least two characteristics. Thus, it is possible to accomplish preferable abnormality diagnosis regarding the air-fuel ratio sensor.

The at least two parameters may be a time constant and a gain, and the at least two of the characteristics of the air-fuel ratio sensor may be response rate and output. Of the characteristics of the air-fuel ratio sensor, the response rate and the output are such important characteristics as to considerably affect the performance of the sensor. Hence, since at least these two important characteristics can be subjected to the abnormality diagnostic, this feature is preferable for the abnormality diagnosis of the air-fuel ratio sensor.

A fuel-cut may be started in accordance with a deceleration requirement when the input air-fuel ratio relatively sharply changes in accordance with the engine operation requirement. Therefore, a reliable change in the input can be stably obtained, so that the identification accuracy can be improved. Besides, since the fuel-cut is relatively frequently executed during normal operation of the engine, the setting of the fuel-cut start time as the identification timing secures a certain frequency of performing diagnosis.

The input may be made up of an inverse number of the input air-fuel ratio. For example, at the transition from the stoichiometric control to the fuel-cut, the input air-fuel ratio changes from, for example, 14.6, to infinity. However, the value of infinity is not easy to handle in the model identification. In the foregoing construction, since the input is made up of the inverse number of the input air-fuel ratio, the input changes from 1/14.6 to 0 at the transition from the stoichiometric control to the fuel-cut. Since 0 is a finite value, the handling of values in the model identification becomes suitable. Therefore, it becomes possible to set the input at a value suitable for the model identification.

The output may be made up of an electric current value that is output by the air-fuel ratio sensor.

In the first aspect, the abnormality diagnostic device may further include a waste time correction unit that calculates a waste time from the input to the output, and that shift-corrects at least one of the input and the output by an amount of the waste time. Therefore, it becomes possible to eliminate the influence of transportation delay and therefore improve the accuracy in the identification of parameters.

The waste time correction unit may calculate the waste time in accordance with a predetermined map or function based on at least one parameter regarding an operation state of the internal combustion engine.

The waste time correction unit may calculate the waste time in accordance with the predetermined map based on the at least one parameter regarding the operation state of the internal combustion engine, and may measure an actual waste time by measuring an actual time difference between the input and the output, and may update data of the map by using the actual waste time when a deviation amount between the calculated waste time and the actual waste time is greater than a predetermined value.

In the first aspect, the abnormality diagnostic device may further include a bias correction unit that shift-corrects at least one of the input and the output so as to remove a bias between the input and the output. Therefore, the robustness to load fluctuation, learning deviation, etc., can be improved.

The identification unit may recursively identify the parameter by a recursive least square method. Therefore, the computation load and the memory capacity for the identification are reduced, thus making an improvement in practicability.

A second aspect of the invention is an abnormality diagnostic method for an air-fuel ratio sensor that detects an air-fuel ratio of an exhaust gas of an internal combustion engine, including: modeling a system extending from a fuel injection valve to the air-fuel ratio sensor by using a first order response delay element; identifying a parameter of the first order response delay element based on an input air-fuel ratio given to the air-fuel ratio sensor which occurs when the input air-fuel ratio is relatively sharply changed in accordance with an engine operation requirement, and an output of the air-fuel ratio sensor that changes in response to a change in the input air-fuel ratio; and determining an abnormality of a predetermined characteristic of the air-fuel ratio sensor based on the identified parameter.

The abnormalities of at least two of characteristics of the air-fuel ratio sensor may be determined based on at least two identified parameters.

The at least two parameters may be a time constant and a gain, and the at least two of the characteristics of the air-fuel ratio sensor may be response rate and output.

A fuel-cut may be started in accordance with a deceleration requirement when the input air-fuel ratio relatively sharply changes in accordance with the engine operation requirement.

The input may be made up of an inverse number of the input air-fuel ratio.

The output is made up of an electric current value that is output by the air-fuel ratio sensor.

In the second aspect, the abnormality diagnostic method may further include: calculating a waste time from the input to the output; and shift-correcting at least one of the input and the output by an amount of the waste time.

The waste time may be calculated in accordance with a predetermined map or function based on at least one parameter regarding an operation state of the internal combustion engine.

In the second aspect, the abnormality diagnostic method may further include: calculating the waste time in accordance with the predetermined map based on the at least one parameter regarding the operation state of the internal combustion engine; measuring an actual waste time by measuring an actual time difference between the input and the output; and updating data of the map by using the actual waste time when a deviation amount between the calculated waste time and the actual waste time is greater than a predetermined value.

Furthermore, a region in a relatively sharp change of the output which allows linear approximation may be specifically determined, and a regression line of the region may be found, and a moving average may be found at least during a predetermined period prior to the relatively sharp change of the output, and a point on the moving average that is able to be regarded as immediately preceding the change may be specifically determined, and a straight line with a constant output that passes through the point may be assumed, and an intersection point between the assumed straight line and the regression line may be found, and a time of the intersection point may be specifically determined as an output change start time, and a time from the input change start time to the output change start time may be calculated, and may be determined as an actual waste time.

In the second aspect, the abnormality diagnostic method may further include: shift-correcting at least one of the input and the output so as to remove a bias between the input and the output.

Thus, the aspects of the invention provide an abnormality diagnostic device and an abnormality diagnostic method for an air-fuel ratio sensor which are capable of suitably diagnosing abnormalities of individual characteristics of the air-fuel ratio sensor and of restraining the deterioration of the exhaust gas emission at the time of diagnosis.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIGS. 5A and 5B are graphs showing the input and the output prior to a bias correction;

FIG. 6 is a graph showing the input and the output after the bias correction;

DETAILED DESCRIPTION OF EMBODIMENTS

Embodiments of the invention will be described with reference to the accompanying drawings.

Figure 1:
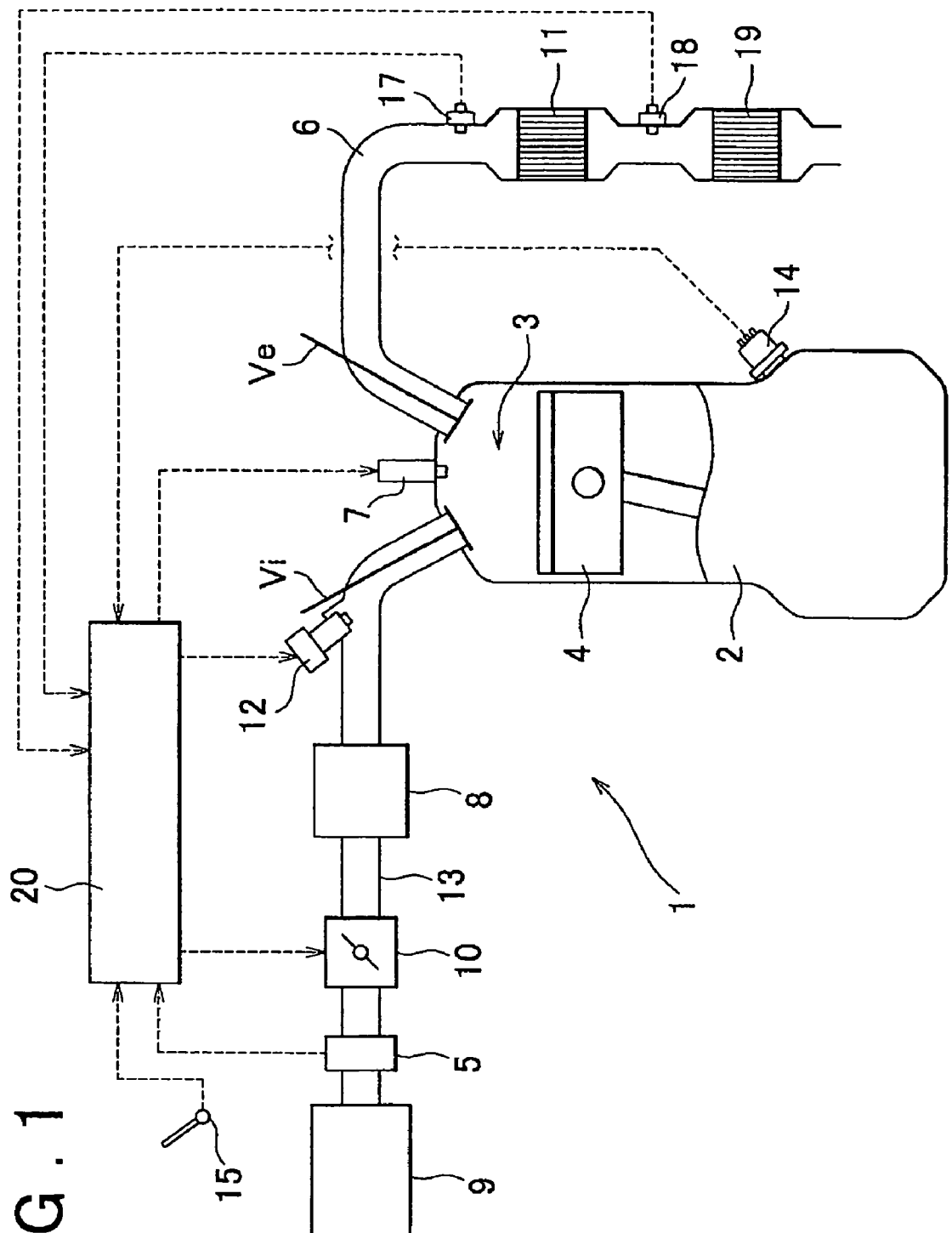
FIG. 1 is a schematic diagram of an internal combustion engine in accordance with an embodiment of the invention.

FIG. 1 is a schematic diagram of an internal combustion engine in accordance with an embodiment. As shown in FIG. 1, an internal combustion engine 1 generates power by burning a mixture of fuel and air within a combustion chamber 3 formed in a cylinder block 2 and therefore reciprocating a piston 4 within the combustion chamber 3. The internal combustion engine 1 of this embodiment is a vehicular multi-cylinder engine (e.g., four-cylinder engine, although only one cylinder is shown), and is a spark ignition type internal combustion engine and, more concretely, a gasoline engine.

A cylinder head of the internal combustion engine 1 is provided with intake valves Vi that open and close input ports and exhaust valves Ve that open and close exhaust ports, for the individual cylinders. The intake valves Vi and the exhaust valves Ve are opened and closed by camshafts (not shown). Besides, in a top portion of the cylinder head, ignition plugs 7 for igniting the mixture in the combustion chambers 3 are mounted for the individual cylinders.

The intake ports of the cylinders are connected to a surge tank 8, which is an intake collective chamber, via branch pipes of the individual cylinders. An intake pipe 13, forming an intake collective passageway, is connected to an upstream side of the surge tank 8. An air cleaner 9 is provided on an upstream end of the intake pipe 13. An air flow meter 5 for detecting the intake air amount, and an electronically controlled throttle valve 10 are incorporated in the intake pipe 13, in that order from the upstream side. The intake ports, the branch pipes, the surge tank 8 and the intake pipe 13 form an intake passageway.

An injector 12 for injecting fuel into the intake passageway and, particularly, the intake port, is provided for each cylinder. The fuel injected from each injector 12 is mixed with intake air to form a mixture that is taken into a corresponding combustion chamber 3 when the intake valve Vi is opened. Then, the mixture is compressed by the piston 4, and is ignited to burn by the ignition plug 7.

On the other hand, the exhaust ports of the cylinders are connected to an exhaust pipe 6 that forms an exhaust collective passageway, via the branch pipes of the individual cylinders. The exhaust ports, the branch pipes and the exhaust pipe 6 form an exhaust passageway. The exhaust pipe 6 is provided with catalysts 11, 19 at an upstream side and a downstream side. Each catalyst 11, 19 is made up of a three-way catalyst. Air-fuel ratio sensors 17, 18 for detecting the air-fuel ratio of exhaust gas are provided at a location preceding the upstream-side catalyst 11 and a location following the upstream-side catalyst 11, that is, a pre-catalyst sensor 17 and a post-catalyst sensor 18 are provided. The pre-catalyst sensor 17 and the post-catalyst sensor 18 each output a signal that corresponds to the oxygen concentration in exhaust gas. The pre-catalyst sensor 17 is made up of a so-called wide-range air-fuel ratio sensor, and is capable of continuously detecting the air-fuel ratio over a relatively wide range, and outputs an electric current signal proportional to the air-fuel ratio. On the other hand, the post-catalyst sensor 18 is made up of a so-called $O_2$ sensor, and has a characteristic that the output voltage changes sharply at and on one side of the stoichiometric air fuel ratio.

The ignition plugs 7, the throttle valve 10, the injectors 12 and the like are electrically connected to an electronic control unit (hereinafter, abbreviated as "ECU") 20 provided as control means. The ECU 20 includes a CPU, a ROM, a RAM, input/output ports, a storage device, etc. although none of them is shown. Various sensors are electrically connected to the ECU 20 as shown in FIG. 1 via A/D converters or the like (not shown). Besides the aforementioned air flow meter 5 as well as the pre-catalyst sensor 17 and the post-catalyst sensor 18, the sensors connected to the ECU 20 also include a crank angle sensor 14 that detects the crank angle of the internal combustion engine 1, an accelerator operation amount sensor 15 that detects the accelerator operation amount, and other various sensors. On the basis of values detected by such sensors and the like, the ECU 20 controls the ignition plugs 7, the throttle valve 10, the injectors 12, etc. to control the ignition timing, the fuel injection amount, the fuel injection timing, the degree of throttle opening, etc. so that a desired output is obtained. Incidentally, in ordinary cases, the throttle opening degree is controlled to an opening degree that corresponds to the accelerator operation amount.

Each of the catalysts 11, 19 simultaneously purifies NOx, HC and CO when the air-fuel ratio A/F of the inflowing exhaust gas is the stoichiometric air fuel ratio (e.g., A/F=14.6). Corresponding to the simultaneous purification of these substances, the ECU 20 controls the air-fuel ratio so that the air-fuel ratio A/F of the exhaust gas flowing into the catalysts 11, 19 becomes equal to the stoichiometric air fuel ratio (so-called stoichiometric control) during ordinary operation of the internal combustion engine. Concretely, the ECU 20 sets a target air-fuel ratio A/Ft equal to the stoichiometric air fuel ratio, and calculates such a basic fuel injection amount that the air-fuel ratio of the mixture flowing into the combustion chamber 3 becomes equal to the target air-fuel ratio A/Ft. In accordance with a difference between the actual air-fuel ratio A/Ffr detected by the pre-catalyst sensor 17 and the target air-fuel ratio A/Ft, the ECU 20 feedback-controls the basic fuel injection amount. Then, the ECU 20 electrifies (turns on) the injectors 12 for an energization time that corresponds to the corrected fuel injection amount. As a result, the air-fuel ratio of the exhaust gas supplied to the catalysts 11, 19 is kept within the vicinity of the stoichiometric air fuel ratio, so that maximum purification capability of the catalysts 11, 19 can be achieved. In this manner, the ECU 20 feedback-controls the air-fuel ratio (the fuel injection amount) so that the actual air-fuel ratio A/Ffr detected by the pre-catalyst sensor 17 approaches the target air-fuel ratio A/Ft.

Incidentally, the pre-catalyst sensor 17 outputs an electric current value that corresponds to the oxygen concentration in the exhaust gas that contacts the pre-catalyst sensor 17. The ECU 20 uses this electric current value for the air-fuel ratio control directly or after converting the current value into an air-fuel ratio. On the other hand, the post-catalyst sensor 18 outputs a voltage value that corresponds to the oxygen concentration in the exhaust gas that contacts the post-catalyst sensor 18, and outputs a voltage value that is basically a binary value, corresponding to whether the oxygen concentration is higher or lower than the oxygen concentration that corresponds to the stoichiometric air fuel ratio. Then, by comparing this voltage value with a reference voltage that corresponds to the stoichiometric air fuel ratio, the ECU 20 determines whether or not the air-fuel ratio of exhaust gas is leaner or richer than the stoichiometric air fuel ratio.

Next, an abnormality diagnosis of the air-fuel ratio sensor in accordance with the embodiment will be described. In this embodiment, an object of the diagnosis is an air-fuel ratio sensor disposed at the upstream side of the upstream-side catalyst 11, that is, the pre-catalyst sensor 17.

In the abnormality diagnosis, the system extending from the injectors 12 to the pre-catalyst sensor 17 is modeled using a first order response delay, and a parameter in the first order response delay is identified (estimated) on the basis of an input based on an input air-fuel ratio given to the pre-catalyst sensor 17 which occurs when the input air-fuel ratio is relatively sharply changed in accordance with an engine operation requirement, and an output of the pre-catalyst sensor 17 that changes in response to the change in the input air-fuel ratio. Then, on the basis of the identified parameter, the presence/absence of an abnormality of a predetermined characteristic of the pre-catalyst sensor 17 is determined.

The engine operation requirement refers to a requirement from a user (a driver in the case of a vehicle) or from the operation situation in accordance with which the engine is operated and controlled. That is, the input air-fuel ratio changing in accordance with the engine operation requirement means that the input air-fuel ratio given to the pre-catalyst sensor 17 changes when the engine is passively operated and controlled in accordance with the requirement from the user or from the operation situation. Hence, the input air-fuel ratio changing in accordance with the engine operation requirement does not include a case where the input air-fuel ratio is forced to change irrelevantly from the requirement from a user or from an operation situation, and typically, does not include a case where the input air-fuel ratio is forced to change by the active air-fuel ratio control as disclosed in Japanese Patent Application Publication No. 2005-30358 (JP-A-2005-30358).

As for the engine in this embodiment, an accelerator member, such as an accelerator pedal, an accelerator lever, etc., is manipulated in accordance with the requirement from the user. The amount of manipulation of the accelerator member, that is, the accelerator operation amount, is detected by the accelerator operation amount sensor 15. Hence, the value of the accelerator operation amount detected by the accelerator operation amount sensor 15 becomes equal to a value that corresponds to the engine operation requirement. In addition, the engine load is changed according to the operation state of a peripheral device (not shown) (e.g., an airconditioner, an A/C generator, etc.), or the engine load is changed according to the running condition of the vehicle and the environment thereof (downhill/uphill run, high altitude, cold climate, etc.). The signal input to the ECU 20 so as to control the engine corresponding to a change in the operation situation as mentioned above corresponds to an engine operation requirement.

Furthermore, the input air-fuel ratio sharply changing means that the rate of change in the input air-fuel ratio is faster than an average change of the input air-fuel ratio during the aforementioned ordinary air-fuel ratio feedback control and the values of the input air-fuel ratio before and after the change are greatly different from each other. The aforementioned change includes both a change toward the lean side and a change toward the rich side.

Thus, in the embodiment of the invention, not in the case, for example, where the input air-fuel ratio is forced to change by the active air-fuel ratio control or the like, but at the time when the input air-fuel ratio is changed relatively sharply, by chance, during the operation of the engine in accordance with an ordinary engine operation requirement, the model identification is performed by utilizing the change, and the presence/absence of abnormality of a predetermined characteristic of the pre-catalyst sensor 17 is determined. Hence, the deterioration of the exhaust gas emissions resulting from a forced change in the air-fuel ratio can be restrained.

The embodiment adopts, as an example of the time when the input air-fuel ratio changes relatively sharply in accordance with the engine operation requirement, the time when the fuel-cut (F/C) of stopping the fuel injection is started in accordance with a deceleration requirement from a user is adopted. At such a time of start of the fuel-cut, the input air-fuel ratio sharply changes from the vicinity of the stoichiometric air-fuel ratio to an infinite, and therefore a reliable input change can be stably obtained. Thus, the time of start of the fuel-cut is a timing that is suitable to perform the model identification. Furthermore; the deceleration fuel-cut is relatively frequently performed during normal operation of the engine, and is therefore suitable to secure a certain frequency of performing diagnosis. In the case of this embodiment, the deceleration fuel-cut is executed if the following two conditions are satisfied: 1) the accelerator operation amount detected by the accelerator operation amount sensor 15 be of a substantially fully closed state, and 2) the engine rotation speed calculated on the basis of the output of the crank angle sensor 14 be higher than or equal to a predetermined speed that is slightly higher than the idling speed. When these two conditions are satisfied, the fuel-cut flag turns on, and the energization of the injector 12 is stopped.

As for the input to the first order response delay model, a value based on the input air-fuel ratio is used. The input air-fuel ratio used in the embodiment is a ratio Ga/Q between an fuel injection amount Q calculated on the basis of the time of energization of the injector 12 and an intake air amount Ga calculated on the basis of the output of the air flow meter 5. Hereinafter, the input air-fuel ratio is represented by vAF (vAF=Ga/Q).

However, in this embodiment, if the value of the input air-fuel ratio is directly used, there occurs an inconvenience as follows. That is, although during the fuel-cut, the fuel injection amount Q=0, that is, the input air-fuel ratio vAF=∞, the value of infinity is not easy to handle in the model identification. In this embodiment, therefore, the inverse number of the input air-fuel ratio (referred to also as "fuel-air ratio") 1/vAF (=Q/Ga) is used as an input. As a result, at the time of transition from the stoichiometric control to the fuel-cut, the input changes from 1/14.6 to 0. Since 0 is a finite value, the input can be suitably handled in the model identification.

In this embodiment, the input u(t) when the fuel-cut is being executed (when the fuel-cut flag is on) is basically represented as in the following equation:

$$u(t)=1/vAF(t) \text{ (when } S_{FC}<\alpha)  \quad (A1)$$

$$u(t)=0 \text{ (when } S_{FC}\geq\alpha) \quad (A2)$$

In the above equations, $S_{FC}$ represents the elapsed time from the fuel-cut start time (the time at which the fuel-cut flag is turned on). Furthermore, α is a predetermined threshold value, and is set at about several hundred milliseconds. The value α is set at a value substantially equal to the time (transportation delay) that it takes for the gas (air) existing in the combustion chamber 3 within the cylinder at the fuel-cut start time to reach the pre-catalyst sensor 17. In addition, when the fuel-cut is not being executed (when the fuel-cut flag is off), the input u(t) is set at the inverse number of the input air-fuel ratio represented as in the foregoing equation (A1).

On the other hand, as for the output with respect to the first order delay system model, the electric current value output by the pre-catalyst sensor 17 is directly used. Hereinafter, this sensor output electric current value is represented by $iO_2$. The output y(t) is basically represented as in the following equation.

$$y(t)=iO_2(t) \quad (B)$$

Figure 2:
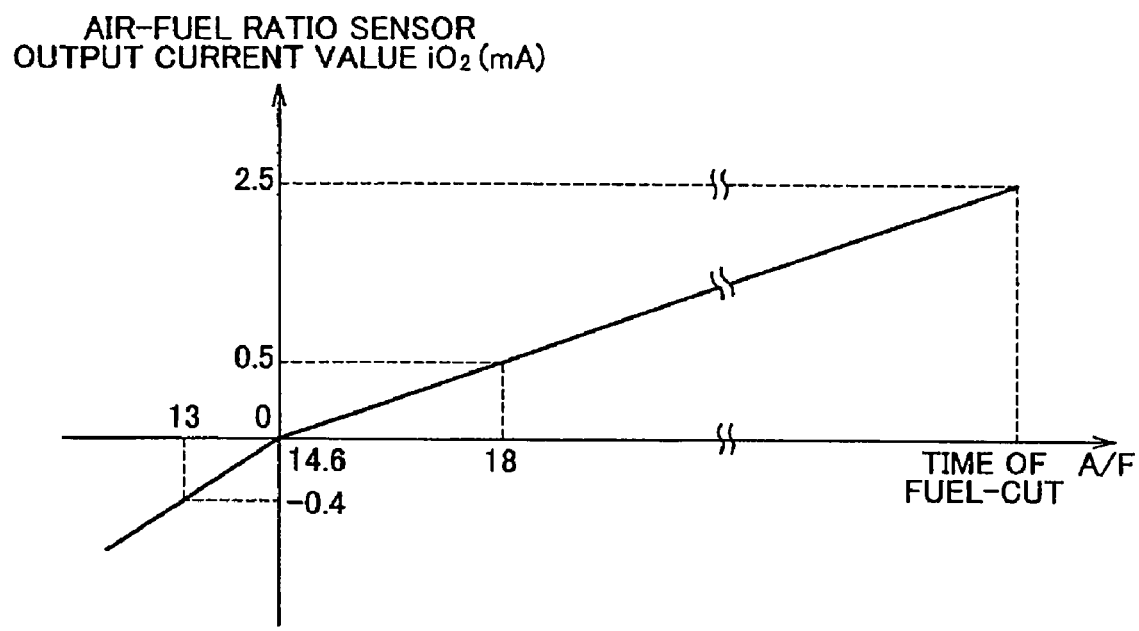
FIG. 2 is a graph showing an example of the output characteristic of a pre-catalyst sensor.

An example of the output characteristic of the pre-catalyst sensor 17 will be described with reference to FIG. 2. As show in FIG. 2, the electric current value $iO_2$ output by the pre-catalyst sensor 17 linearly changes in accordance with the oxygen concentration or the air-fuel ratio of the exhaust gas that contacts the pre-catalyst sensor 17. In the example shown in FIG. 2, when the exhaust gas air-fuel ratio is the stoichiometric air fuel ratio (14.6), the sensor output electric current value is 0 (mA). When the exhaust gas air-fuel ratio is 18, the sensor output electric current value is about 0.5 (mA). When the exhaust gas air-fuel ratio is 13, the sensor output electric current value is about −0.4 (mA). Besides, during the fuel-cut (F/C), the pre-catalyst sensor 17 is in contact with air. At this time, corresponding to the oxygen concentration (20%) in air, the sensor output electric current value reaches its maximum value (lean limit), which is about 2.5 (mA). At the transition from the stoichiometric control to the fuel-cut, the sensor output electric current value rapidly changes from the vicinity of 0 (mA) to about 2.5 (mA). Since the sensor output electric current value is finite all the time, including the time of the fuel-cut, the sensor output electric current value is suitable for the model identification.

At the start of the fuel-cut, the input u(t), which is the inverse number of the input air-fuel ratio at the time, changes rapidly from the vicinity of 1/14.6 to 0. In response to this, the output y(t), made up of the sensor output electric current value, changes rapidly from the vicinity of 0 mA to the vicinity of 2.5 mA. From the relationship between the input change and the output change, the parameter of the first order response delay is identified. On the basis of the identified parameter, the presence/absence of abnormality of a predetermined characteristic of the pre-catalyst sensor 17 is determined.

Figure 3:
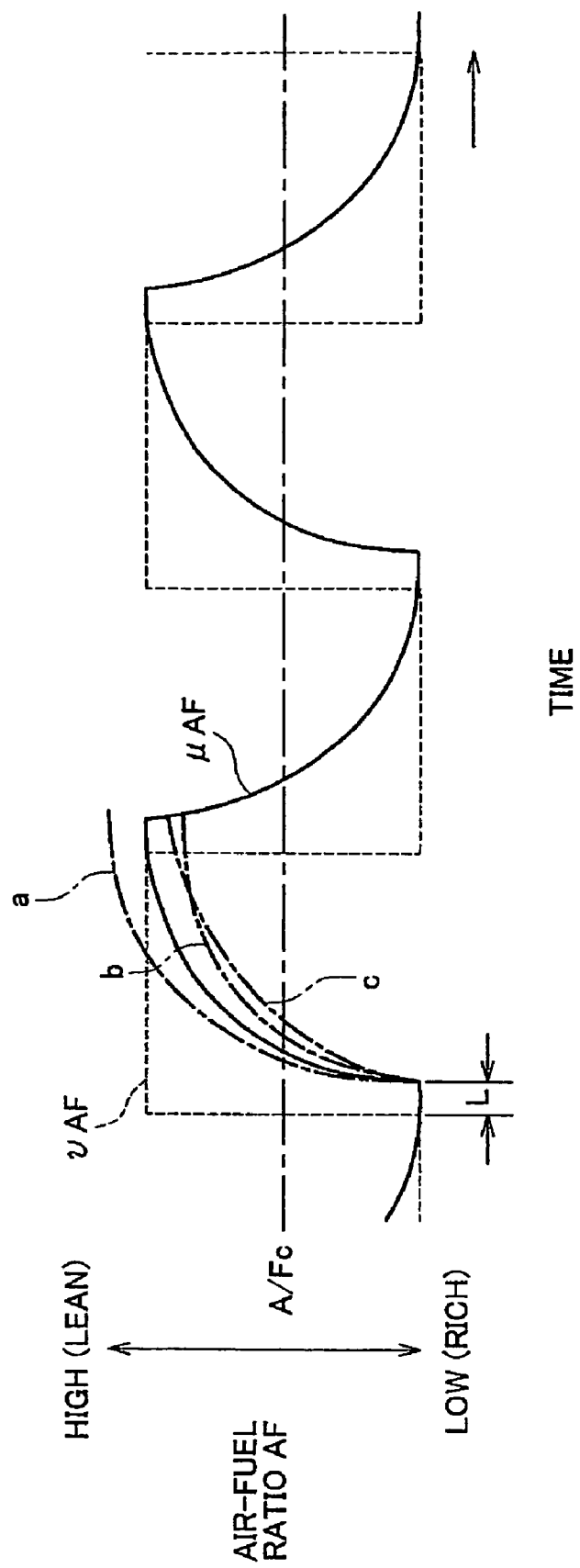
FIG. 3 is a graph showing changes in the input air-fuel ratio and the output air-fuel ratio as a reference.

Abnormality of a characteristic of the pre-catalyst sensor 17 will be described. FIG. 3 shows a relationship between the input air-fuel ratio vAF and the output air-fuel ratio µAF when the active air-fuel ratio control is executed, in order to facilitate the understanding. The input air-fuel ratio vAF is a value calculated as Ga/Q as described above, and the output air-fuel ratio µAF is a value converted from the output electric current value $iO_2$ of the pre-catalyst sensor 17. As already stated above, in the identification method in this embodiment, the active air-fuel ratio control is not carried out. It is to be noted herein that the example shown in FIG. 3 is merely for illustration of abnormality of a characteristic of the sensor, and has nothing to do with the identification method of the embodiment.

As shown in FIG. 3, as the active air-fuel ratio control is executed, the air-fuel ratio of the mixture at the location of the injector 12 (i.e., input air-fuel ratio vAF) is forced to oscillate at a constant frequency and with a constant amplitude, and, following this oscillation, the air-fuel ratio detected by the pre-catalyst sensor 17 (i.e., the output air-fuel ratio µAF) is similarly oscillated. A center air-fuel ratio A/Fc that is the center of the oscillation is set equal to the stoichiometric air fuel ratio. Besides, the amplitude of the oscillation is equal on the lean side and the rich side, and is greater than the amplitude occurring during the normal air-fuel ratio control, for example, is set at 0.5 in air-fuel ratio.

While the input air-fuel ratio vAF has a rectangular stepped waveform, the output air-fuel ratio µAF has a waveform with a first order response delay. In FIG. 3, L represents a waste time based on the transportation delay from the input air-fuel ratio vAF to the output air-fuel ratio µAF. That is, the waste time L corresponds to the time lag that it takes for the gas existing in the combustion chamber 3 in the cylinder to reach the pre-catalyst sensor 17.

If it is assumed that the waste time L is zero for the sake of simplification, the first order response delay is represented as in G(s)=k/(1+Ts). In this equation, k is the gain of the pre-catalyst sensor 17, and T is a time constant of the pre-catalyst sensor 17. The gain k is a value related to the output of the pre-catalyst sensor 17, among the characteristics thereof. On the other hand, the time constant T is a value related to the response rate of the pre-catalyst sensor 17, among the characteristics thereof. In FIG. 3, a solid line representing the output air-fuel ratio µAF shows a case where the pre-catalyst sensor 17 is normal. On the other hand, if an abnormality occurs in the output characteristic of the pre-catalyst sensor 17, the gain k becomes greater than during a normal condition, so that the sensor output increases (enlarges) as shown by a line a, or the gain k becomes smaller than during the normal condition, so that the sensor output decreases (shrinks) as shown by a line b. Therefore, by comparing the identified gain k with a predetermined value, the ECU 20 can specifically determine whether there is an increase abnormality or a decrease abnormality in the sensor output. On the other hand, if an abnormality occurs in the response rate of the pre-catalyst sensor 17, the time constant T, in most cases, becomes greater than during a normal condition, so that the sensor output is produced with a delay as shown by a line c.

Therefore, by comparing the identified time constant T with a predetermined value, the ECU 20 can specifically determine the presence/absence of an abnormality in the response rate of the sensor.

Next, a method for the identification of the gain k and the time constant T executed by the ECU 20 will be described. Herein, basic values as represented in the foregoing equations (A1), (A2) and (B) are used as the input u(t) and the output y(t).

Firstly, a transfer function of a first order delay system that has a time constant T and a gain k is represented as follows.

$$G(s) = \frac{k}{1 \times T \times s} \tag{1}$$

A bilinear transformation s→z (continuous→discrete transformation)

$$s = \frac{2(1 - z^{-1})}{\Delta(1 + z^{-1})} \quad (\Delta: \text{sampling interval}) \tag{2}$$

is applied to the foregoing equation (is substituted for s therein) to give $$G(z) = \frac{\Delta \times k \times Z^{-1} + \Delta \times k}{(\Delta - 2T) \times Z^{-1} + (\Delta + 2T)} = \frac{Z^{-1} + 1}{b_2 Z^{-1} + b_1} \tag{3}$$

$$\left( \because b_1 = \frac{\Delta - 2T}{\Delta \times k}, b_2 = \frac{\Delta + 2T}{\Delta \times k} \right) \tag{4}$$

The equations (4) are solved with respect to T and k to give $$T = \frac{b_1 - b_2}{b_1 + b_2} \times \frac{\Delta}{2}, k = \frac{2}{b_1 + b_2} \tag{5}$$

Thus, if unknown parameters $b_1$, $b_2$ are found, the time constant T and the gain k of the sensor can be found from the equation (5).

Now, if the measured input and output are represented as $\bar{u}(t)$, $\bar{y}(t)$, respectively, and the corresponding z transformations are represented as $\bar{U}(z)$, $\bar{Y}(z)$, respectively, the following equation is obtained from the equation (3).

$$\bar{Y}(z) = G(z) \times \bar{U}(z) = \frac{z^{-1} + 1}{b_2 z^{-1} + b_1} \times \bar{U}(z) \rightarrow \tag{6}$$

$$b_2 \bar{Y}(z) z^{-1} + b_1 \bar{Y}(z) = \bar{U}(z) z^{-1} + \bar{U}(z)$$

Besides, if the equation (6) is subjected to the inverse z transformation, the following equation is obtained.

$$b_2 \bar{y}(t-1) + b_1 \bar{y}(t) = \bar{u}(t-1) + \bar{u}(t) \tag{7}$$

If this equation is reorganized in terms of sample times t, t−1, . . . , 1, the following equation is obtained.

$$\begin{bmatrix} \bar{u}(t) + \bar{u}(t-1) \\ \bar{u}(t-1) + \bar{u}(t-2) \\ \text{---------} \\ \bar{u}(2) + \bar{u}(1) \end{bmatrix} = \begin{bmatrix} \bar{y}(t) & \bar{y}(t-1) \\ \bar{y}(t-1) & \bar{y}(t-2) \\ \text{----------} \\ \bar{y}(2) & \bar{y}(1) \end{bmatrix} \begin{bmatrix} b_1 \\ b_2 \end{bmatrix} \tag{8}$$

With the following redefinition:

$$y(t) = \bar{u}(t) + \bar{u}(t+1)$$

$$\phi(t) = [\bar{y}(t), \bar{y}(t-1)]^T \tag{9}$$

the equation (8) can be expressed as follows.

$$\begin{bmatrix} y(t) \\ y(t-1) \\ \text{-----} \\ y(2) \end{bmatrix} = \begin{bmatrix} \varphi^T(t) \\ \varphi^T(t-1) \\ \text{------} \\ \varphi^T(2) \end{bmatrix} \begin{bmatrix} b_1 \\ b_2 \end{bmatrix} \Rightarrow y = F \times \theta \tag{10}$$

Hence, the least square identification value of the identification parameter vector $\theta$ that includes the unknown parameters $b_1$, $b_2$ can be identified as in $\hat{\theta} = (F^T F)^{-1} \times F^T y$. Furthermore, T and k can be found from the equation (5).

From the foregoing discussion, $\hat{\theta}(t)$ can be determined by calculating the inverse matrix $(F^T F)^{-1}$. However, considering the packaging into the ECU, the inverse matrix increases the amount of calculation, and is therefore not preferable. Therefore, recursive solution of the inverse matrix portion is conceivable.

Firstly, given $P(t) = (F^T F)^{-1}$.

$$\hat{\theta}(t) = P(t) F^T \times y \tag{11}$$

$$= P(t) \left\{ [\varphi(1), \varphi(2), \text{---}, \varphi(t)] \begin{bmatrix} y(1) \\ y(2) \\ --- \\ --- \\ y(t) \end{bmatrix} \right\}$$

$$= P(t) \sum_{k=1}^{t} \varphi(k) y(k)$$

From the equation (11), $$\hat{\theta}(t-1) = P(t-1) \sum_{k=1}^{t-1} \varphi(k) y(k)$$

is also given. Therefore, the equation (11) can also be written as $$\hat{\theta}(t) = P(t) \left\{ \sum_{k=1}^{t-1} \varphi(k) y(k) + \varphi(t) y(t) \right\} \tag{12}$$

$$= P(t) \{ P^{-1}(t-1) \times \hat{\theta}(t-1) + \varphi(t) y(t) \}$$

Besides, $$P(t) = (F^T F)^{-1} \quad (13)$$

$$= \left\{ [\varphi(1), \varphi(2), ---, \varphi(t)] \begin{bmatrix} \varphi^T(1) \\ \varphi^T(2) \\ --- \\ --- \\ --- \\ \varphi^T(t) \end{bmatrix} \right\}^{-1}$$

$$= \left\{ \sum_{k=1}^{t} \varphi(k) \varphi^T(k) \right\}^{-1}$$

can be modified into $$P^{-1}(t) = \sum_{k=1}^{t} \varphi(k) \varphi^T(k) \quad (14)$$

$$= \sum_{k=1}^{t-1} \varphi(k) \varphi^T(k) + \varphi(t) \varphi^T(t)$$

$$= P^{-1}(t-1) + \varphi(t) \varphi^T(t)$$

If, using the equation (14), the term $P^{-1}(t-1)$ in the equation (12) is eliminated, $\hat{\theta}(t)$ can be represented by the following recurrence formula.

$$\hat{\theta}(t) = P(t)\{(P^{-1}(t) - \varphi(t)\varphi^T(t)) \times \hat{\theta}(t-1) + \varphi(t)y(t)\} \quad (15)$$

$$= \hat{\theta}(t-1) + P(t)\varphi(t)(y(t) - \varphi^T(t) \times \hat{\theta}(t-1))$$

Herein, if in the following theorem regarding the inverse matrix:

$$(A^{-1} + C^T B^{-1} D)^{-1} = A - AC^T (DAC^T + B)^{-1} DA \quad (16)$$

replacements of A→P(t−1), C→φ$^T$(t), B→1, and D→φ$^T$(t) are made, the equation (14) can be expressed as follows:

$$\{P^{-1}(t-1) + \varphi(t)\varphi^T(t)\}^{-1} = \{P^{-1}(t)\}^{-1} = P(t) = \quad (17)$$

$$P(t-1) - P(t-1)\varphi(t)\{\varphi^T(t)P(t-1)\varphi(t) + 1\}^{-1} \varphi^T(t) \times P(t-1)$$

If the equation (17) is modified after the two sides thereof are multiplied by φ(t), P(t) can also be expressed in a manner of a recurrence formula as follows:

$$P(t)\varphi(t) = P(t-1)\varphi(t) \times \frac{1}{\varphi^T(t)P(t-1)\varphi(t) + 1} = K(t) \quad (18)$$

where $\phi^T(t)P(t-1)\phi(t)+1$ is a scalar.

The prediction error is defined as follows:

$$\epsilon(t) = y(t) - \phi^T(t) \times \hat{\theta}(t-1) \quad (19)$$

By substituting the equations (18) and (19) in the equation (15), $\hat{\theta}$ is finally expressed by the following recurrence formula:

$$\hat{\theta}(t) = \hat{\theta}(t-1) + K(t) \times \epsilon(t) \quad (20)$$

Thus, $\hat{\theta} = (F^T F)^{-1} F^T \times y$ can be recursively solved.

The equation (20) is a function of the values obtained at the present sample time t and the previous sample time t−1, and means that b1 and b2, that is, T and k, are updated at every sample time on the basis of the present values and the previous values. In this manner, the time constant T and the gain k are recursively identified by a recursive least square method. This method of performing the recursive identification is able to lessen the computation load and reduce the capacity of the buffer for temporarily holding data, as compared with a method in which many pieces of sample data are acquired and stored temporarily, and then the identification is performed. Thus, the above-described method is preferable in the packaging into an ECU (in particular, a motor vehicle-purpose ECU).

The abnormality determination method regarding the sensor characteristic performed by the ECU 20 is as follows. Firstly, if the identified time constant T is larger than a predetermined time constant abnormality criterion value Ts, it is determined that a response delay has occurred and therefore the pre-catalyst sensor 17 has a response rate abnormality. On the other hand, if the identified time constant T is less than or equal to the time constant abnormality criterion value Ts, it is determined that the pre-catalyst sensor 17 is normal in terms of the response rate.

Furthermore, if the identified gain k is greater than a predetermined gain increase abnormality criterion value ks1, it is determined that the pre-catalyst sensor 17 has an output increase abnormality. If the identified gain k is smaller than a gain reduction abnormality criterion value ks2(<ks1), it is determined that the pre-catalyst sensor 17 has an output decrease abnormality. If the identified gain k is greater than or equal to the gain reduction abnormality criterion value ks2 and is less than or equal to a gain increase abnormality criterion value. ks1, it is determined that the pre-catalyst sensor 17 is normal in terms of output.

Thus, according to the abnormality diagnosis in accordance with the embodiment, what is determined is not merely the presence/absence of an abnormality of the air-fuel ratio sensor, but the presence/absence of an abnormality of a predetermined characteristic of the air-fuel ratio sensor. Furthermore, using the two identification parameters T and k, the presence/absence of an abnormality is determined with regard to two important sensor characteristics, that is, the response rate and the output, in a simultaneous and individual fashion. Hence, it is possible to discriminate which of a plurality of characteristics of the air-fuel ratio sensor is abnormal, and therefore execute the abnormality diagnosis of the air-fuel ratio sensor more elaborately and minutely. Then, it becomes possible to realize a very suitable abnormality diagnosis of the air-fuel ratio sensor.

Furthermore, since the identification is performed when the input air-fuel ratio given to the air-fuel ratio sensor changes relatively sharply in accordance with the engine operation requirement, the deterioration of exhaust gas emission at the time of the diagnosis can be restrained without making an intentional and forced change in the input air-fuel ratio through the active air-fuel ratio control or the like. It is desirable that the model identification of the air-fuel ratio sensor be performed at a timing when the input air-fuel ratio changes as sharply and greatly as possible. In this embodiment, since the model identification is performed when the input air-fuel ratio happens to change so due to a normal engine control, the high-accuracy identification and diagnosis can be executed while the deterioration of exhaust gas emission is restrained. Besides, since the time of start of the fuel-cut is adopted as a time at which the input air-fuel ratio changes relatively sharply as mentioned above, a reliable change in input can be stably obtained, so that the identification accuracy can be improved and a frequency of performing diagnosis can be secured. Furthermore, since the inverse number of the air-fuel ratio is used as an input for the identification, it is possible to provide an input that is suitable to the model identification at the time of start of the fuel-cut.

In the meantime, an actual engine undergoes various disturbances such as load fluctuations and the like. If these disturbances are not appropriately taken into consideration, the identification accuracy or the robustness cannot be improved. Therefore, in the abnormality diagnosis in accordance with this embodiment, various corrections are performed on input/output data as described below, so that the identification is performed on the basis of the post-correction input/output data.

Figure 4:
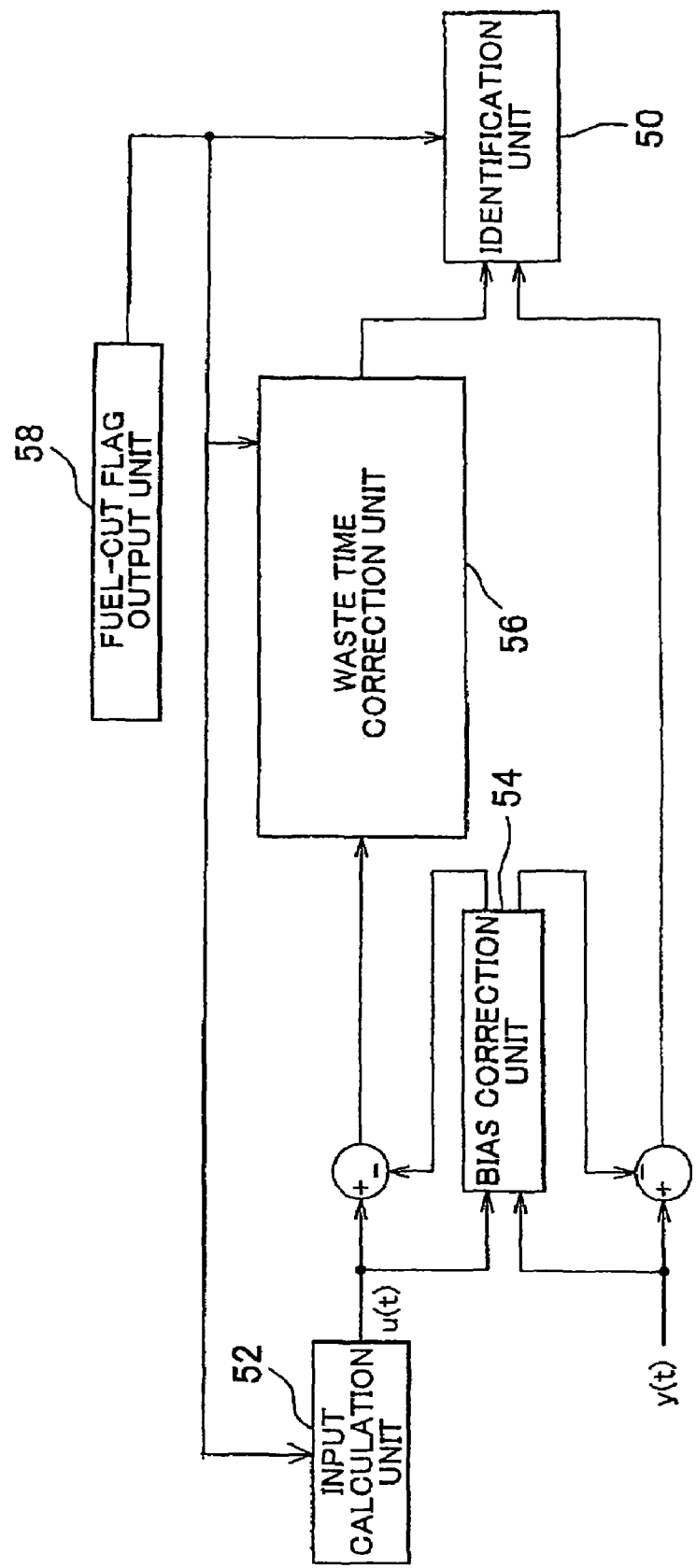
FIG. 4 is a block diagram of an entire system for identifying parameters.

FIG. 4 is a block diagram of an entire system for identifying model parameters. Such a system is constructed within the ECU 20. In order to identify the foregoing parameters T and k in an identification unit (identification means) 50, there are provided an input calculation unit 52, a bias correction unit (bias correction means) 54, and a waste time correction unit (waste time correction means) 56. Since the abnormality diagnosis is carried out at the time of start of the fuel-cut, a fuel-cut flag output unit 58 is also provided. The fuel-cut flag output unit 58 outputs a fuel-cut flag-on signal or a fuel-cut flag-off signal to each of the input calculation unit 52, the waste time correction unit 56, and the identification unit 50 corresponding to the execution or stop of the fuel-cut.

The input calculation unit 52 calculates the input u(t). Specifically, if the fuel-cut is being executed and the elapsed time $S_{FC}$ from the fuel-cut start time (the time at which the fuel-cut flag-on signal starts to be output from the fuel-cut flag output unit 58 to the input calculation unit 52) is smaller than a predetermined threshold value α, the inverse number 1/vAF of the input air-fuel ratio is calculated as the input u(t) in accordance with the foregoing equation (A1). If the fuel-cut is being executed and the elapsed time $S_{FC}$ from the fuel-cut start time is greater than or equal to the predetermined threshold value α, 0 is calculated as the input u(t) in accordance with the foregoing equation (A2). Furthermore, during the fuel-cut stop time (the time when the fuel-cut flag-off signal is being output from the fuel-cut flag output unit 58 to the input calculation unit 52), the inverse number 1/vAF of the input air-fuel ratio is calculated as the input u(t).

Next, the bias correction unit 54 will be described. In the bias correction unit 54, both the input u(t) and the output y(t) are shift-corrected so as to remove the bias between the input u(t) and the output y(t).

In some cases, one of the input u(t) and the output y(t) may become biased (deviated) from the other to the lean side or the rich for such causes as load fluctuation, learning deviation, sensor value deviation, etc. Since it is not preferable to perform the identification in such a biased state, such a correction as to remove the bias is performed.

FIGS. 5A and 5B show changes in the input u(t) and the output y(t) (see solid lines). Portions of the lines where the input u(t) is 0 and where the output y(t) is a lean limit (about 2.5 mA) show that the fuel-cut is being executed. As for the method of bias correction, the data of the input u(t) and the output y(t) are passed through a low-pass filter, or moving averages thereof are calculated, so that the biased values $u_b(t)$ and $y_b(t)$ are recursively calculated (see dashed lines). Then, the based values $u_b(t')$ and $y_b(t')$ at a time t' when $S_{FC} \geq \alpha$ is first satisfied (the time when the elapsed time from the fuel-cut start time first becomes greater than or equal to α) are acquired (see a circled region). Since the predetermined value α is a very short time of about several hundred milliseconds, the biased values $u_b(t')$ and $y_b(t')$ at the time t' are substantially the same as the biased values prior to the fuel-cut. In the example shown, the input biased value $u_b(t')$ is about 0.075 and the output biased value $u_b(t')$ is about 0.

Prior to the fuel-cut, the stoichiometric control is executed, and therefore the air-fuel ratio is controlled so that the output of the pre-catalyst sensor 17 is within the vicinity of 0 mA, which corresponds to the stoichiometric air fuel ratio (=14.6). Therefore, the output y(t) of the pre-catalyst sensor 17 fluctuates about 0 mA, and the value thereof after the passage through the low-pass filter or the moving average $y_b(t)$ thereof is also in the vicinity of 0 mA. On the other hand, although the input u(t) needs to be the inverse number of the stoichiometric air fuel ratio, that is, 1/14.6=0.068, the input u(t) is about 0.075 in the example shown in FIG. 5A since there is a bias to the rich side.

Therefore, a correction of removing such a bias is performed. As described above, after the bias values $u_b(t')$ and $y_b(t')$ at the time t' are found, the post-bias correction input and output u'(t), y'(t) are recursively calculated as in the following equations on the basis of the bias values $u_b(t')$ and $y_b(t')$, the input u(t) and the output y(t).

$$u'(t)=u_b(t')-u(t)$$

$$y'(t)=y_b(t')+y(t)$$

The values of the input u'(t) and the output y'(t) after the bias correction of the input u(t) and the output y(t) in the circled region in FIG. 5 are shown enlarged in FIG. 6. As can be seen from FIG. 6, the input u(t) and the output y(t) are both converted by the bias correction into such zero-based values that the input u(t) and the output y(t) become substantially zero before the fuel-cut. As for the input, since the post-bias correction input u'(t) is calculated by subtracting the input u(t) from the biased value $u_b(t')$, the post-bias correction input u'(t) sharply changes to the plus side at the time of start of the fuel-cut, and exhibits the same tendency as the post-bias correction output y'(t). Incidentally, the post-bias correction input u'(t) may also be calculated by subtracting the biased value $u_b(t')$ from the input u(t). In this case, at the time of start of the fuel-cut, the post-bias correction input u'(t) sharply changes to the minus side similarly to the pre-correction input u(t), so that the post-identification gain is obtained as a minus value.

In this manner, the bias is removed, and the fluctuation centers of the post-bias removal input and output are adjusted to zero, so that the influences of load fluctuation, learning deviation, etc., can be eliminated. Therefore, the robustness to load fluctuation, learning deviation, etc., can be heightened.

Although the foregoing example adopts the method in which the bias between the input and the output is removed by correcting both the input and the output and adjusting the fluctuation centers of the input and the output to zero, other methods can also be adopted. For example, it is permissible to adopt a method in which only the input is corrected and the fluctuation center thereof is adjusted to the fluctuation center of the output, or only the output is corrected in a similar manner. It suffices that the object of the correction be at least one of the input and the output.

Next, the waste time correction unit 56 will be described. As described above with reference to FIG. 3, a waste time L due to a transportation delay exists between the input air-fuel ratio vAF and the output air-fuel ratio μAF. This waste time L naturally exists in the same manner between the inverse number 1/vAF of the input air-fuel ratio, which is the input u(t), and the sensor output electric current value iO$_2$, which is the output y(t). In order to accurately perform the identification of model parameters, it is preferable to perform such a correction as to remove the waste time L. Therefore, such a correction is performed in the waste time correction unit 56. Concretely, the waste time L is calculated by a method described below, and the input u(t) is delayed by the waste time L so as to correspondingly approach the output y(t).

Figure 7:
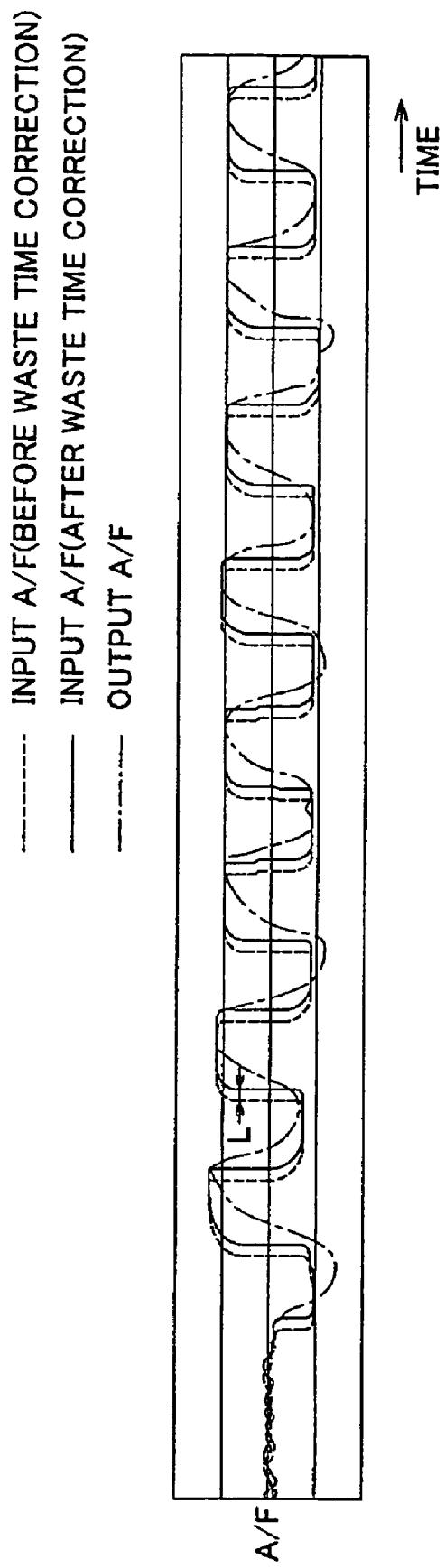
FIG. 7 is a graph showing, as a reference, the input air-fuel ratio before or after the post waste time correction and the output air-fuel ratio.

To facilitate the understanding, FIG. 7 shows the input air-fuel ratios vAF before or after the post waste time correction and the output air-fuel ratio μAF. A dashed line shows the pre-correction input air-fuel ratio, an a solid line shows the post-correction input air-fuel ratio, and a one-dot chain line shows the output air-fuel ratio. As a result of the input air-fuel ratio being corrected so as to be delayed by the amount of waste time L, the post-correction input air-fuel ratio and the output air-fuel ratio come to change substantially without any time difference therebetween. Therefore, the influence of the transportation delay, which is irrelevant to the degraded state of the sensor, is excluded, so that the accuracy in the identification of model parameters can be improved.

Figure 8:
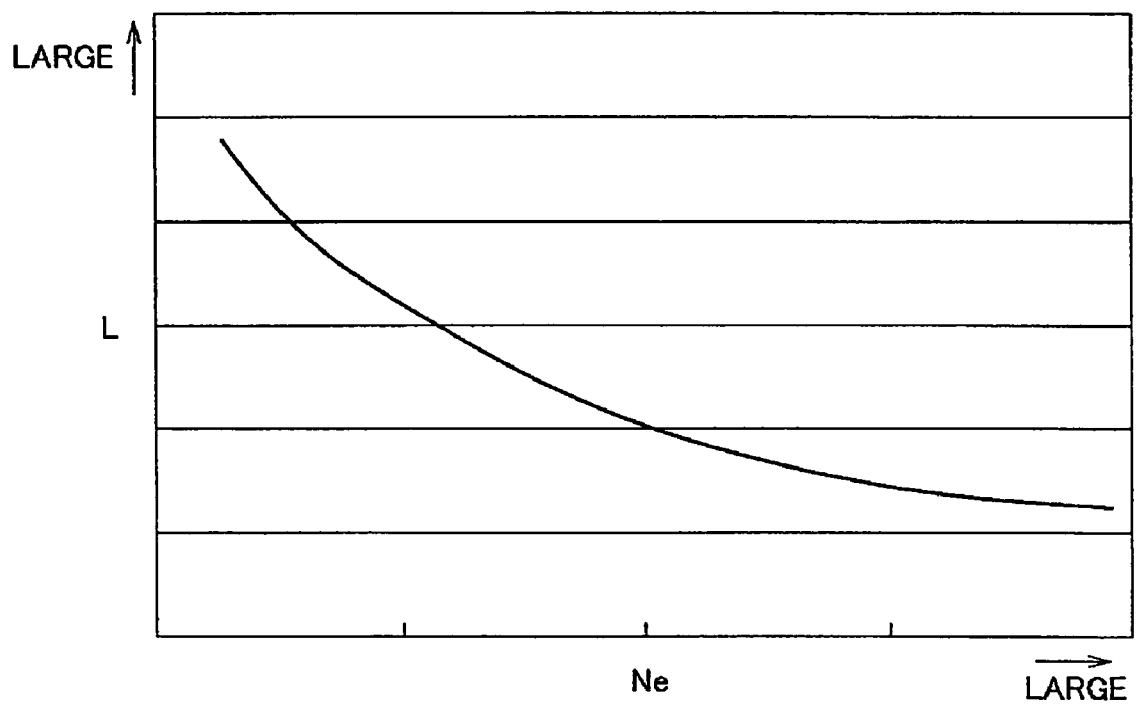
FIG. 8 shows a waste time calculation map.

As for the calculation method for the waste time in this embodiment, a method in which the waste time is calculated in accordance with a predetermined map (or a function) on the basis of at least one parameter regarding the engine operation state is adopted. FIG. 8 shows an example of such a waste time calculation map. As can be understood from this map, the waste time L is calculated on the basis of the detected value of the engine rotation speed Ne in this embodiment. The waste time L is set at a value that is smaller the greater the engine rotation speed Ne becomes. A reason for this is that the greater the engine rotation speed Ne, the faster the exhaust gas flow speed becomes and the less the transportation delay becomes.

As for the calculation timing of the waste time, the engine rotation speed Ne occurring in the vicinity of the time of start of the fuel-cut, for example, the engine rotation speed Ne occurring at the time t' at which $S_{FC} \geq \alpha$ is first satisfied, is acquired, and a waste time is calculated from the map on the basis of the acquired engine rotation speed Ne.

In the meantime, the foregoing map is created beforehand on the basis of an actual machine test or the like, and there may be possibility of the map data coming to fail to match the actual values as the period of use of the engine increases. Therefore in this embodiment, the actual waste time Lr is measured in the waste time correction unit 56 by the following method, and the measured actual waste time Lr is used to update the map data in accordance with need, so that a more accurate waste time can always be acquired from the map. Hereinafter, a measurement method for the actual waste time Lr and an update method for map data will be described.

Figure 9:
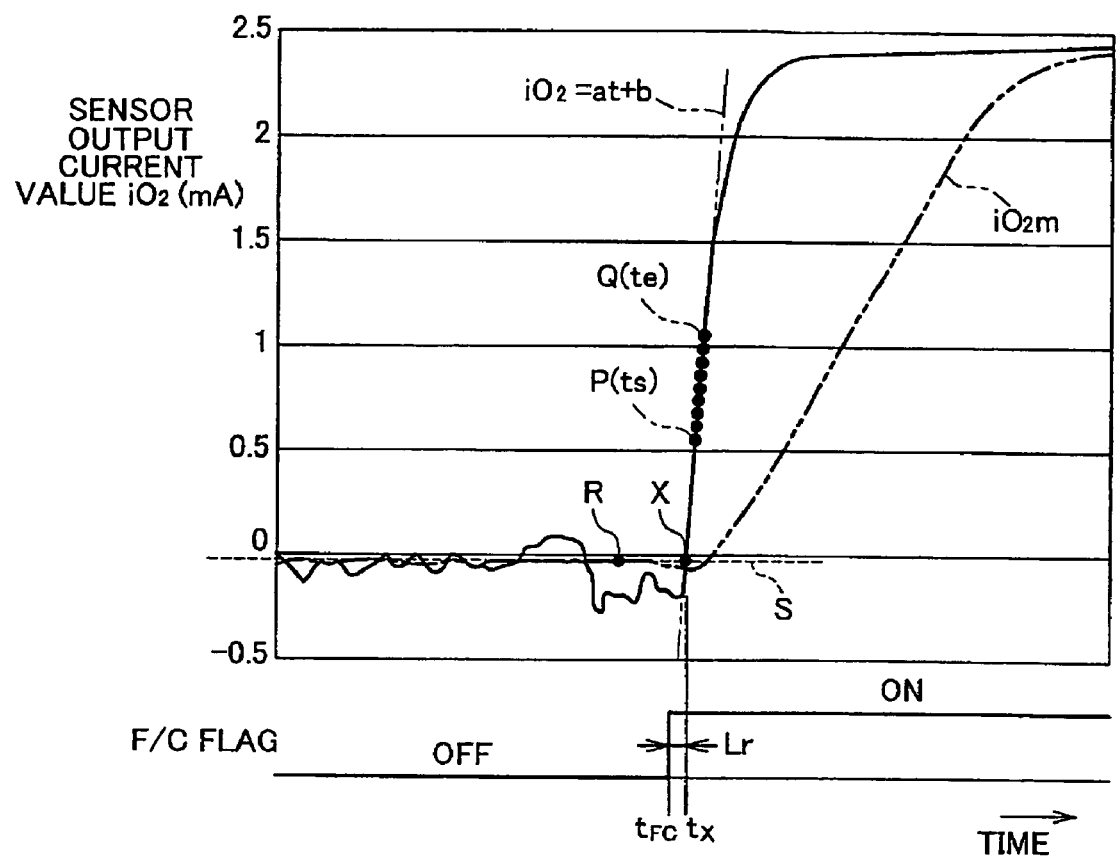
FIG. 9 is a diagram for describing a measurement method for the actual waste time.

In FIG. 9, the manner of changing of the sensor output electric current value iO$_2$ as the output y(t) in the vicinity of the time of start of the fuel-cut is shown by a solid line. In a lowest portion of the drawing, the on/off state of a fuel-cut flag is shown as well. As shown in FIG. 9, when the fuel-cut flag is turned on and the fuel-cut is started, the sensor output electric current value iO$_2$ sharply and greatly rises with a slight delay from the start time $t_{FC}$, and reaches an electric current value (about 2.5 mA) that corresponds to the level during the fuel-cut. Incidentally, the sensor output electric current value iO$_2$ immediately following the start of the fuel-cut is not stable, and therefore it is difficult to determine at which time point the sensor output electric current value iO$_2$ began to rise. Therefore, the measurement of the actual waste time Lr, including the specific determination of the rise start point of the sensor output electric current value iO$_2$, is performed in the following procedure.

Firstly, a region in the rise of the sensor output electric current value iO$_2$ in which the sensor output electric current value iO$_2$ undergoes a substantially linear and constant monotonous increase and therefore allows linear approximation is specifically determined. Concretely, the times ts and te of the start point and the end point of the region where the linear approximation is possible are determined. The measurement process is performed repeatedly at every predetermined cycle period of the order of several milliseconds to several ten milliseconds, similarly to the other processes performed in the ECU. In FIG. 9, a plurality of points on the graph of the sensor output electric current value iO$_2$ represent the measured values of sensor output electric current of various cycle periods. In this embodiment, the time of the point P at which the sensor output electric current value iO$_2$ first exceeds 0.5 mA on the lean side of the stoichiometric air fuel ratio is determined as the start point time ts. Besides, the time of the point Q at which the sensor output electric current value iO$_2$ first exceeds 1 mA on the lean side is determined as the end point time te. The start point time ts and the end point time te are represented as follows:

$$ts = \min(t)|iO_2(t) > 0.5$$

$$te = \min(t)|iO_2(t) > 1.0$$

Next, a regression line connecting two points P, Q that correspond to the start point time ts and the end point time te: iO$_2$=at+b is found (shown by a two-dot chain line). Alternatively, such a regression line may be approximately found from data regarding a plurality of points that are contained between the start point time ts and the end point time te, by using the least square method On the other hand, as shown by a two-dot chain line, the moving average iO$_2$m of the sensor output electric current value iO$_2$ is recursively found. The moving average iO$_2$m is found at least in a predetermined period before the sensor output electric current value iO$_2$ rises, and preferably is found in a predetermined period immediately before the sensor output electric current value iO$_2$ rises. In the example shown, the moving average is found all the time.

Then, on the line of the moving average, a point R that can be regarded as a point that immediately precedes the rise of the sensor output electric current value iO$_2$. In this embodiment, a point R on the moving average line that corresponds to a predetermined time (1 second in this embodiment) prior to the start point time ts. The sensor output electric current value at the point R is written as iO$_2$mR, and is represented as in the following equation.

$$iO_2mR = iO_2m(t)t = ts - 1.0$$

Furthermore, a straight line S with a constant sensor output electric current value that passes through the point R is assumed, and an intersection point X between the straight line S and the foregoing regression line: iO$_2$=at+b is found. Then, this intersection point X is specifically determined as a rising start point of the sensor output electric current value iO$_2$, and the time $t_X$ of the intersection point X is specifically determined as a rising start time of the sensor output electric current value $iO_2$. The rising start time $t_X$ is represented as in the following equation.

$$t_X = (iO_2 mR - b)/a$$

After that, the time Lr ($=t_X-t_{FC}$) from the fuel-cut start time $t_{FC}$ to the sensor output electric current value rising start time $t_X$ is calculated, and the time Lr is determined as an actual waste time. In this manner, the measurement of the actual waste time ends.

On the other hand, a waste time L that corresponds to the engine rotation speed Ne at the time of measurement of the actual waste time Lr (e.g., the time $t_X$) is acquired from the map shown in FIG. 8. This waste time L as the acquired map data and the measured actual waste time Lr are compared. If a difference therebetween is greater than a predetermined value, the waste time L as map data is replaced with the measured actual waste time Lr, and the map data is updated. This post-update value is utilized for the next and later times of calculation of the waste time.

Although in the above-described waste time correction, the input is delayed by the amount of the waste time so as to as to becomes the same in timing as the output, other methods of correction can also be adopted. For example, by a method in which the recursive identification is not performed, for example, by a method in which many pieces of sample data are acquired and temporarily stored and then identification is performed, the output can be made the same in timing as the input by advancing the output by the amount of the waste time, or the input and the output can be made the same in timing by delaying the input and advancing the output in timing. It suffices that the object of correction be at least one of the input and the output.

Figure 10:
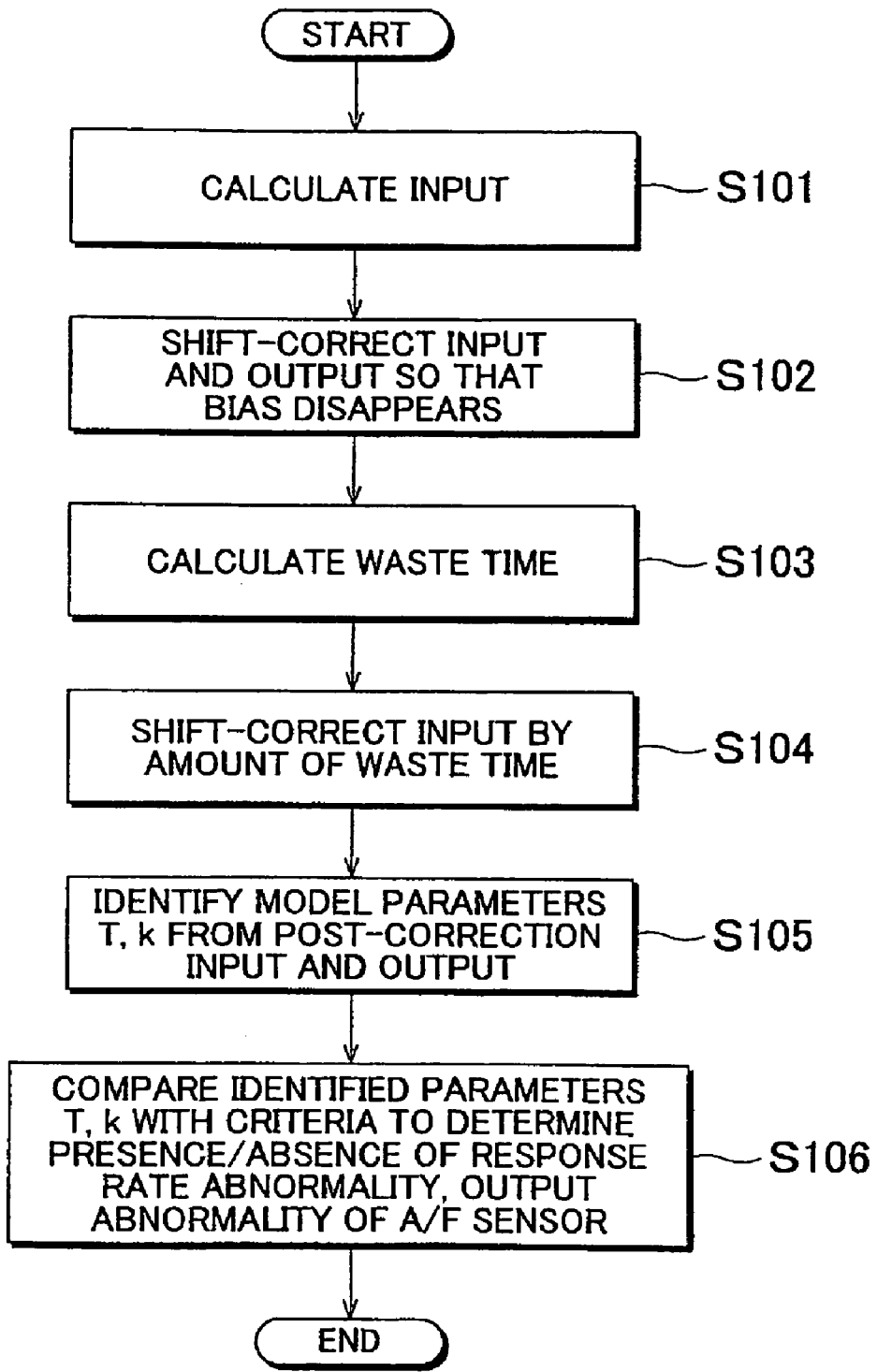
FIG. 10 is a flowchart schematically showing a procedure of abnormality diagnosis of the air-fuel ratio sensor of the embodiment.

Next, a procedure of air-fuel ratio sensor abnormality diagnosis that includes all the foregoing corrections will be described with reference to FIG. 10. Firstly in step S101, an input u(t) is calculated on the basis of the foregoing equations (A1) and (A2). In step S102, the values of the input u(t) and the output y(t) are shift-corrected so that the bias between the input and the output disappears.

Subsequently in step S103, the waste time L is calculated form a map as shown in FIG. 8. In step S104, the post-bias correction input u(t) is shift-corrected by the amount of the waste time L so that the waste time L disappears. Next, in step S105, from a relationship between the post-waste time correction input u(t) obtained in step S104 and the post-bias correction output y(t) obtained in step S102, the time constant T and the gain k, which are model parameters, are identified. Then, in step S106, the identified parameters T, k are compared with abnormality criterion values (the time constant abnormality criterion value Ts, the gain increase abnormality criterion value ks1 and the gain reduction abnormality criterion value ks2), and thus it is determined whether each of the response rate and the output of the air-fuel ratio sensor (pre-catalyst sensor 17) is normal or abnormal.

FIGS. 11A to 11D and FIGS. 12A to 12D show results of the recursive identification of the time constant T and the gain k in the case of a normal pre-catalyst sensor 17 and in the case of an abnormal pre-catalyst sensor 17. FIGS. 11A to 11D show the results obtained in the case of the normal pre-catalyst sensor 17, and FIGS. 12A to 12D show the results obtained in the case of the abnormal pre-catalyst sensor 17. As the abnormal precatalyst sensor 17, a sensor that was substantially the same in output and about twice as high in response rate as the normal pre-catalyst sensor 17 was used.

As shown in FIGS. 11A, 11B, 12A and 12B, when the fuel-cut is not being executed (when the fuel-cut flag is off (see dashed lines)), the stoichiometric control is being executed. During such periods, the value of the input u(t)(pre-correction input) as a basic value is a value in the vicinity of the inverse number of the stoichiometric air fuel ratio, that is, 1/14.6=0.068, and the value of the output y(t) is a value in the vicinity of 0 mA, which corresponds to the stoichiometric air fuel ratio.

On the other hand, when the fuel-cut is being executed (when the fuel-cut flag is on (see the dashed lines)), the value of the input u(t) is the inverse number of the air-fuel ratio until before the elapse of a predetermined time α from the fuel-cut start time point. Until that time, the input u(t) instantly changes toward 0. In response to this, the value of the output y(t) also instantly changes toward the maximum value (about 2.5 mA) on the lean side. Then, after the elapse of the predetermined time α from the fuel-cut start time point, the value of the input u(t) is maintained at 0 and the value of the output y(t) is maintained at the maximum value (about 2.5 mA) on the lean side.

Figure 11A:
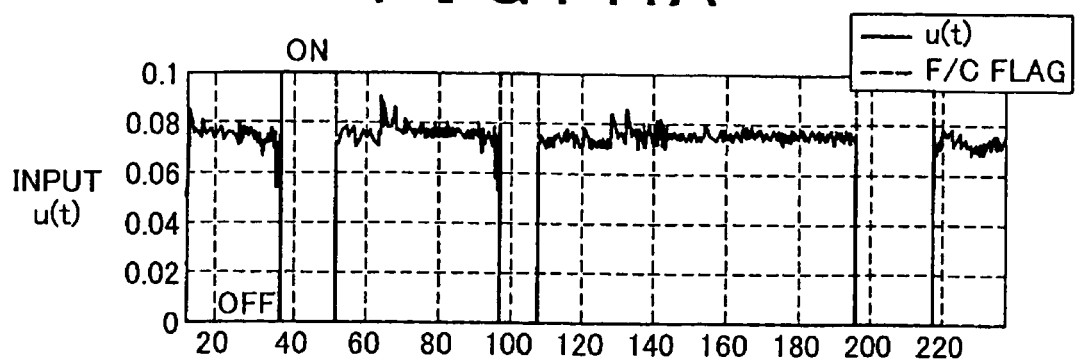
FIGS. 11A to 11D show results of identification of the time constant and the gain in the case of a normal sensor.
Figure 11B:
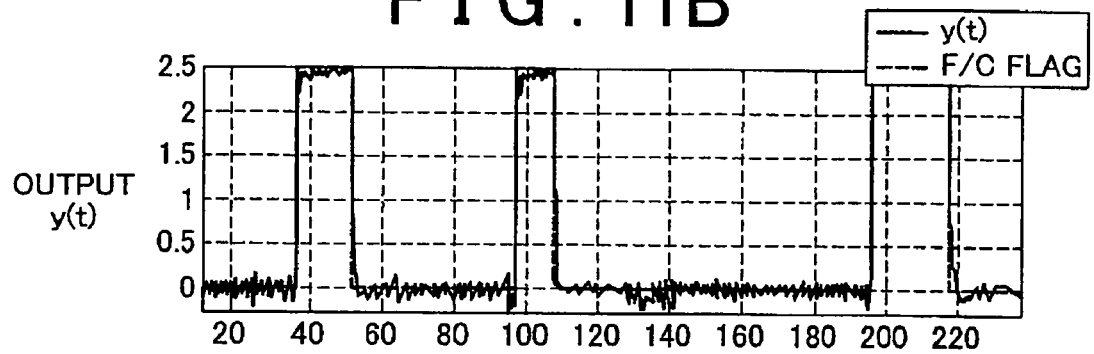
Figure 11C:
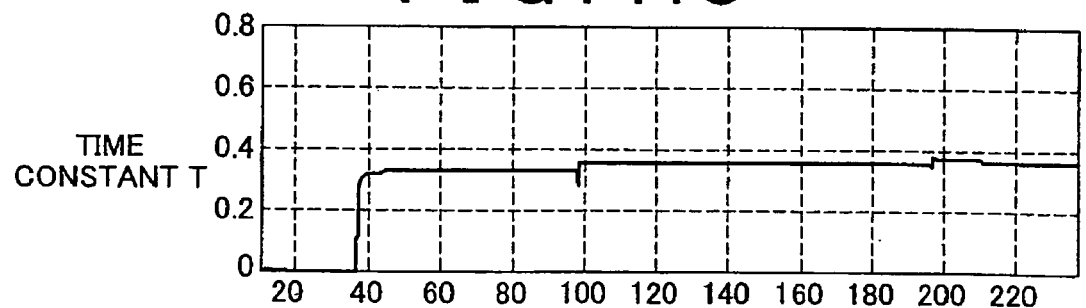
Figure 11D:
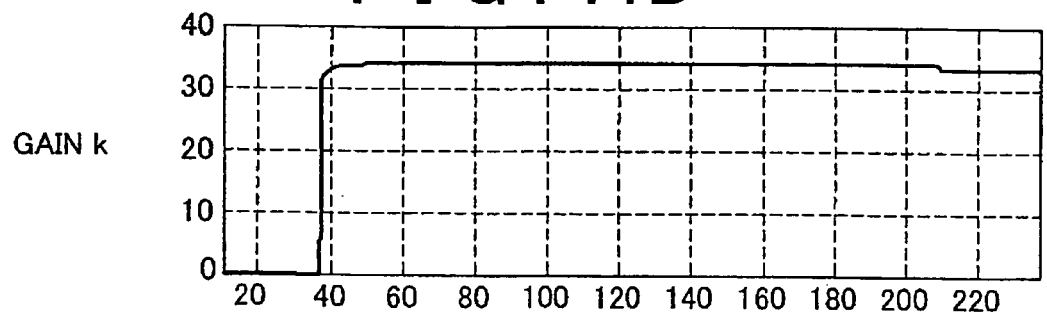
Figure 12A:
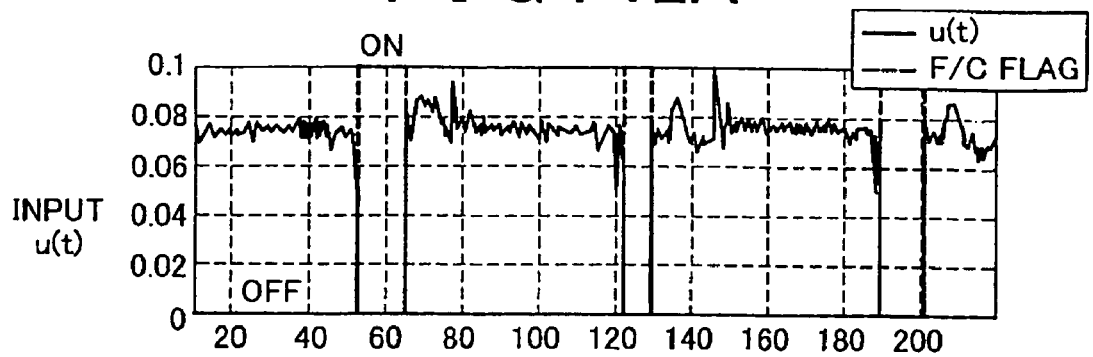
FIGS. 12A to 12D show results of identification of the time constant and the gain in the case of an abnormal sensor.
Figure 12B:
Figure 12C:
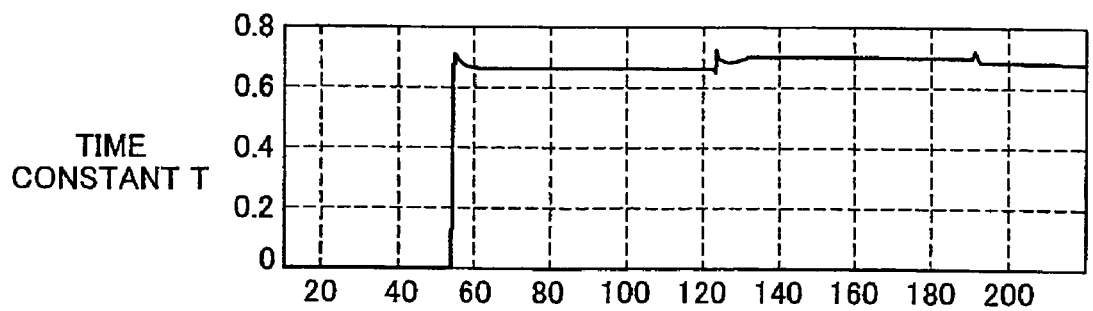
Figure 12D:
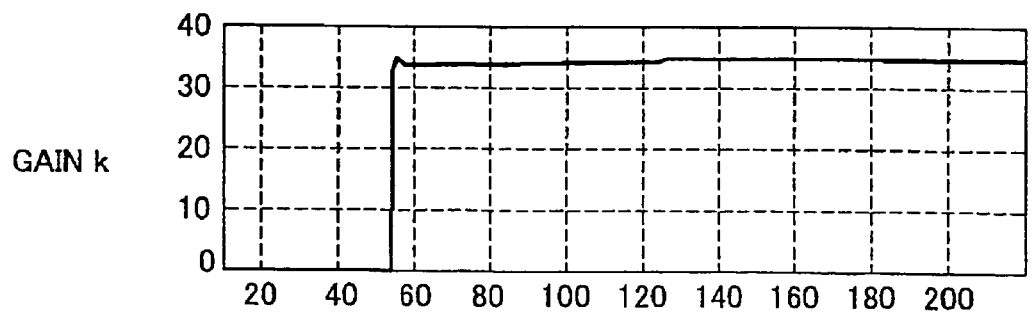

For the input and the output as described above, the bias correction and the waste time correction are performed, and the post-correction input and output are used to recursively identify the time constant T and the gain k. The time constant T and the gain k thus identified are substantially updated every time the fuel-cut starts. As shown in FIGS. 11D and 12D, the value of the gain k converged to substantially the same value (about 33) in the case of the normal sensor and the case of the abnormal sensor. In contrast, as shown in FIGS. 11C and 12C, the value of the time constant T converged to a value of about 0.35 in the case of the normal sensor whereas in the case of the abnormal sensor, the value of the time constant T converged to a value of about 0.7, about twice the value of the convergence in the case of the normal sensor. This confirms that it is possible to obtain substantially the same results as the results obtained when the input and the output of an actual sensor are used.

As for the determination regarding normality/abnormality of the pre-catalyst sensor 17, the values of the time constant T and the gain k updated through at least one start time of the fuel-cut, and preferably a plurality of fuel-cut start times, are compared with abnormality criterion values to determine whether the response rate and the output are normal or abnormal.

While an embodiment of the invention has been described in detail, other various embodiments of the invention are also conceivable. For example, although the foregoing internal combustion engine is an intake port (intake passageway) injection-type spark ignition engine, the type of engine and the method of fuel injection thereof are not particularly limited. The invention is applicable to direct injection engines, diesel engines, etc. Although the foregoing embodiment is applied to a so-called wide-range air-fuel ratio sensor, the invention is also applicable to a so-called $O_2$ sensor, such as the post-catalyst sensor 18. Sensors for detecting the air-fuel ratio of exhaust gas, including the aforementioned $O_2$ sensors, are defined as air-fuel ratio sensors in the invention.

Although in the foregoing embodiment, the presence/absence of an abnormality is diagnosed with respect to two of the characteristics of the air-fuel ratio sensor, that is, the response rate and the output, this is not restrictive. For example, the presence/absence of an abnormality may also be diagnosed with respect to one or three or more of the characteristics. Likewise, as for the parameter of the first order response delay, it is permissible to use only one of the time constant T and the gain k, or use other parameters in addition to the time constant T and the gain k. Although in the foregoing embodiment, the two parameters T, k of the first order response delay are simultaneously identified, and the presence/absence of abnormality is determined simultaneously with respect to the two characteristics of the air-fuel ratio sensor, this is not restrictive. For example, at least two parameters may also be identified with a time difference therebetween, or the presence/absence of an abnormality regarding at least two characteristics may be performed with a time difference therebetween.

Although in the foregoing embodiment, the air-fuel ratio is controlled to the stoichiometric air fuel ratio at times other than the time of the fuel-cut, this is not restrictive. For example, the air-fuel ratio may be controlled to an air-fuel ratio on the lean side of the stoichiometric air-fuel ratio (so-called lean burn control).

Incidentally, in the foregoing embodiment, the ECU 20 constitutes identification means, an abnormality determination means, a waste time correction means, and bias correction means.

Embodiments of the invention are not limited only to the foregoing embodiments, but include all the modifications, applications, and equivalents encompassed in the spirit of the invention, which is defined by the appended claims. Therefore, the invention should not be interpreted in any limiting manner, but can be applied to any art that belongs to the scope of the spirit of the invention.

What is claimed is:

1. An abnormality diagnostic device for an air-fuel ratio sensor that detects an air-fuel ratio of an exhaust gas of an internal combustion engine, comprising:
   an Electronic Control Unit (ECU) including:
      an identification portion that models a system extending from a fuel injection valve to the air-fuel ratio sensor by using a first order response delay element, and that identifies at least one parameter of the first order response delay element based on an input based on an input air-fuel ratio given to the air-fuel ratio sensor which occurs when the input air-fuel ratio is sharply changed in accordance with an engine operation requirement, and an output of the air-fuel ratio sensor that changes in response to a change in the input air-fuel ratio; and
      an abnormality determination portion that determines abnormalities of a response rate and an output of the air-fuel ratio sensor based on the parameter identified by the identification portion.

2. The abnormality diagnostic device according to claim 1, wherein the abnormality determination portion determines abnormalities of at least two of characteristics of the air-fuel ratio sensor based on at least two parameters identified by the identification unit.

3. The abnormality diagnostic device according to claim 2, wherein
   the at least two parameters are a time constant and a gain, and
   the at least two of the characteristics of the air-fuel ratio sensor are the response rate and the output.

4. The abnormality diagnostic device according to claim 1, wherein a fuel-cut is started in accordance with a deceleration requirement when the input air-fuel ratio sharply changes in accordance with the engine operation requirement.

5. The abnormality diagnostic device according to claim 4, wherein the input is an inverse of the input air-fuel ratio.

6. The abnormality diagnostic device according to claim 1, wherein the output is made up of an electric current value that is output by the air-fuel ratio sensor.

7. The abnormality diagnostic device according to claim 1, wherein the ECU further includes a waste time correction portion that calculates a waste time from the input to the output, and that shift-corrects at least one of the input and the output by an amount of the waste time.

8. The abnormality diagnostic device according to claim 7, wherein the waste time correction portion calculates the waste time in accordance with a predetermined map or function based on at least one parameter regarding an operation state of the internal combustion engine.

9. The abnormality diagnostic device according to claim 7, wherein the waste time correction portion calculates the waste time in accordance with the predetermined map based on the at least one parameter regarding the operation state of the internal combustion engine, measures an actual waste time by measuring an actual time difference between the input and the output, and updates data of the map by using the actual waste time when a deviation amount between the calculated waste time and the actual waste time is greater than a predetermined value.

10. The abnormality diagnostic device according to claim 1, wherein the ECU further includes a bias correction portion that shift-corrects at least one of the input and the output so as to remove a bias between the input and the output.

11. The abnormality diagnostic device according to claim 1, wherein the identification portion recursively identifies the parameter by a recursive least square method.

12. An abnormality diagnostic method for an air-fuel ratio sensor that detects an air-fuel ratio of an exhaust gas of an internal combustion engine, comprising:
   modeling a system extending from a fuel injection valve to the air-fuel ratio sensor by using a first order response delay element;
   identifying at least one parameter of the first order response delay element based on an input air-fuel ratio given to the air-fuel ratio sensor which occurs when the input air-fuel ratio is sharply changed in accordance with an engine operation requirement, and an output of the air-fuel ratio sensor that changes in response to a change in the input air-fuel ratio; and
   determining an abnormality of at least one predetermined characteristic of the air-fuel ratio sensor based on the identified parameter.

13. The abnormality diagnostic method according to claim 12, wherein abnormalities of at least two of characteristics of the air-fuel ratio sensor are determined based on at least two identified parameters.

14. The abnormality diagnostic method according to claim 13, wherein the at least two parameters are a time constant and a gain, and the at least two of the characteristics of the air-fuel ratio sensor are response rate and output.

15. The abnormality diagnostic method according to claim 12, wherein a fuel-cut is started in accordance with a deceleration requirement when the input air-fuel ratio sharply changes in accordance with the engine operation requirement.

16. The abnormality diagnostic method according to claim 15, wherein the input is an inverse of the input air-fuel ratio.

17. The abnormality diagnostic method according to claim 12, wherein the output is made up of an electric current value that is output by the air-fuel ratio sensor.

18. The abnormality diagnostic method according to claim 12, further comprising:
   calculating a waste time from the input to the output; and
   shift-correcting at least one of the input and the output by an amount of the waste time.

19. The abnormality diagnostic method according to claim 18, wherein the waste time is calculated in accordance with a predetermined map or function based on at least one parameter regarding an operation state of the internal combustion engine.

20. The abnormality diagnostic method according to claim 18, further comprising:

calculating the waste time in accordance with the predetermined map based on the at least one parameter regarding the operation state of the internal combustion engine;

measuring an actual waste time by measuring an actual time difference between the input and the output; and updating data of the map by using the actual waste time when a deviation amount between the calculated waste time and the actual waste time is greater than a predetermined value.

21. The abnormality diagnostic method according to claim 20, wherein a region in a sharp change of the output which allows linear approximation is specifically determined, and a regression line of the region is found, and a moving average is found at least during a predetermined period prior to the sharp change of the output, and a point on the moving average that is able to be regarded as immediately preceding the change is specifically determined, and a straight line with a constant output that passes through the point is assumed, and an intersection point between the assumed straight line and the regression line is found, and a time of the intersection point is specifically determined as an output change start time, and a time from the input change start time to the output change start time is calculated, and is determined as an actual waste time.

22. The abnormality diagnostic method according to claim 12, further comprising:

shift-correcting at least one of the input and the output so as to remove a bias between the input and the output.

* * * * *